(12) United States Patent
Yokokohji et al.

(10) Patent No.: US 6,956,503 B2
(45) Date of Patent: Oct. 18, 2005

(54) IMAGE DISPLAY APPARATUS, IMAGE DISPLAY METHOD, MEASUREMENT APPARATUS, MEASUREMENT METHOD, INFORMATION PROCESSING METHOD, INFORMATION PROCESSING APPARATUS, AND IDENTIFICATION METHOD

(75) Inventors: Yasuyoshi Yokokohji, Kyoto (JP); Shinji Uchiyama, Kanagawa (JP); Kiyohide Satoh, Kanagawa (JP); Daisuke Eto, Uji (JP); Tomoyasu Nakatsuru, Kyoto (JP); Tsuneo Yoshikawa, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/660,637

(22) Filed: Sep. 12, 2003

(65) Prior Publication Data

US 2004/0113818 A1 Jun. 17, 2004

(30) Foreign Application Priority Data

Sep. 13, 2002 (JP) .................................... 2002-268832
Sep. 5, 2003 (JP) .................................... 2003-314422

(51) Int. Cl.$^7$ ............................................. G08G 1/123
(52) U.S. Cl. .................... 340/988; 340/995.1; 340/905; 340/990; 340/991; 340/993; 340/435; 340/461; 702/150; 702/104; 702/181; 702/182
(58) Field of Search ............................... 340/988, 995, 340/905, 990, 991, 993, 435, 436, 461; 702/104, 150, 181, 182

(56) References Cited

U.S. PATENT DOCUMENTS

| | | | |
|---|---|---|---|
| 6,275,773 B1 * | 8/2001 | Lemelson et al. ............ | 701/301 |
| 6,281,806 B1 * | 8/2001 | Smith et al. ................. | 340/901 |
| 2002/0103617 A1 | 8/2002 | Uchiyama et al. ........... | 702/150 |
| 2004/0090444 A1 | 5/2004 | Satoh ............................ | 345/633 |

FOREIGN PATENT DOCUMENTS

| | | |
|---|---|---|
| JP | 11-084307 | 3/1999 |
| JP | 2000-041173 | 2/2000 |
| JP | 2000-276613 | 10/2000 |
| JP | 2000-354230 | 12/2000 |

OTHER PUBLICATIONS

J. Fukano, S. Okabayashi, M. Sakata, "Automotive Head–Up Displays for Navigation Use" The Fourteenth International Technical Conference On Enhanced Safety Of Vehicles, No. 94–S2–O–02, pp. 306–314 (1994).

Donald B. Gennery, "Visual Tracking of Known Three–Dimensional Objects" International Journal of Computer Vision, vol. 7, No. 3 pp. 243–270 (1992).

Y. Yokokohji, Y. Sugawara, T. Yoshikawa, "Accurate Image Overlay on Viedo See–Through HMDs Using Vision and Accelerometers" Transactions of the Virtual Reality Society of Japan, vol. 4, No. 4, pp. 589–598 (1999).

* cited by examiner

Primary Examiner—Tai T. Nguyen
(74) Attorney, Agent, or Firm—Fitzpatrick, Cella, Harper & Scinto

(57) ABSTRACT

An external index detection unit (105) receives an image sensed by a camera (100), and detects an external index set in a real scene. A tachometer (110) measures the rotational velocities of two rear wheels of a vehicle. A vehicle measurement unit (120) measures the position and azimuth of the vehicle on the basis of the image coordinate position of the external index and the rotational velocities of the two rear wheels of the vehicle. A head index detection unit (135) receives an image sensed by a camera (130), and detects a head index set on the head of a passenger (132). A head measurement unit (140) measures the position of the head on the basis of the image coordinate position of the head index. An image generation unit (150) generates a display image based on the position and azimuth of the vehicle and the position of the head, so that the passenger can observe predetermined navigation information superimposed at a predetermined position of the real scene, and controls a projector (160) to project the generated image.

10 Claims, 22 Drawing Sheets

FIG. 18

```
                5901
                 (
  {              )
     PointMarker p1 {
        Position      ( 0, 0, 80 ) ~~ 5902
        normalVector  ( 1, 0, 0 ) ~~ 5903
        color         red ~~ 5904
     }
     PointMarker p2 {
        Position      ( 0, 0, -200 )
        normalVector  ( 0, 1, 0 )
        color         red
     }
     PointMarker p3 {
        Position      ( 0, 100, 0 )
        normalVector  ( -1, 0, 0 )
        color         red
     }
     PointMarker p4 {
        Position      ( 0, 80, 0 )
        normalVector  ( 0, -1, 0 )
        color         blue
     }
  }
```

IMAGE DISPLAY APPARATUS, IMAGE DISPLAY METHOD, MEASUREMENT APPARATUS, MEASUREMENT METHOD, INFORMATION PROCESSING METHOD, INFORMATION PROCESSING APPARATUS, AND IDENTIFICATION METHOD

FIELD OF THE INVENTION

The present invention relates to an image display technique which comprises a display device that displays an image to be presented to a passenger on a vehicle on the front windshield portion of the vehicle, an identification technique of an index used to measure the position and orientation of an image sensing device, which comprises an image sensing unit for sensing an image of a real space, and a position/orientation measurement unit for roughly measuring the position and orientation, or an object to be measured.

BACKGROUND OF THE INVENTION

Car navigation systems have prevailed since they can offer many functions at lower prices in recent years. Along with the advances of ITS (Intelligent Transport Systems), a car navigation display is expected to function as a terminal which presents various kinds of information that assist the driver in addition to navigation information.

However, with the conventional car navigation system, the driver must temporarily turn his or her eyes to the interior of the vehicle to observe the display. Hence, the driver can only recognize traffic by peripheral vision, and must temporarily shift attention away from the scene in the front of the vehicle.

As a technique that can solve this problem, an HUD (Head Up Display) is known. The HUD is a device for projecting and displaying an image on the front windshield. With this device, the driver can acquire navigation information without turning his or her eyes from the real scene.

With the conventional car navigation system, the driver must associate navigation information (normally superposed on a map) presented on the display with the real scene by himself or herself, and such information is not easily recognized intuitively.

To solve this problem, a device called "On-the-Scene HUD" has been conventionally proposed. The On-the-Scene HUD presents navigation information on the front windshield of a vehicle, which is considered as a see-through display, so that the navigation information that the driver wants is superimposed at an appropriate position on the real scene (for example, refer to J. Fukano, S. Okabayashi, & M. Sakata, "Automotive Head-Up Displays for Navigation Use", The 14th International Technical Conference on Enhanced Safety of Vehicles, No. 94-S2-0-02, pp. 306–314, 1994 (non-patent reference 1)).

As described in non-patent reference 1, the driver can quickly recognize navigation information using the On-the-Scene HUD. However, this reference does not describe any practical registration method required to present navigation information to be superimposed at an appropriate position on the real scene.

In general, a technique for superimposing predetermined information at a predetermined position on the real scene is called a mixed reality technique. In a general arrangement of a mixed reality presentation apparatus, an observer can simultaneously observe an image displayed on a display and a real scene observed via the display by wearing a see-through type HMD (Head Mounted Display) on his or her head. At this time, in order to superimpose a predetermined image at a predetermined position on the real scene, the viewpoint position and orientation of the observer in the real scene must be measured, and an image must be generated accordingly.

The viewpoint position and orientation of the observer can be measured by various methods. A method of attaching a magnetic sensor or ultrasonic sensor to the HMD is normally used. However, since a magnetism or ultrasonic wave source must be arranged in the real scene, the movable range of the observer is limited. Also, such method cannot obtain sufficiently high measurement precision.

On the other hand, as a method that can measure the viewpoint position and orientation with high precision without any restrictions on the measurement range, a method of detecting an index in the real scene from video data sensed by a video camera attached to an HMD, and measuring the viewpoint position and orientation on the basis of the detected index has been proposed. For example, in a conventional system, since the image coordinate position of the index extracted from the image is used as an input to an Extended Kalman Filter, the viewpoint position and orientation are estimated as state variables (for example, refer to Yasuyoshi Yokokoji, Yoshihiko Sugawara, & Tsuneo Yoshikawa, "Accurate Image Overlay on HMD using Vision and Accelerometers", Transactions of the Virtual Reality Society of Japan, Vol. 4, No. 4, pp. 589–598, 1999 (non-patent reference 2)).

However, the registration method in the aforementioned mixed reality presentation apparatus using the HMD cannot realize registration in the On-the-Scene HUD. This is because the viewpoint of the observer is fixed with respect to the display in the HMD, while the relative positional relationship between the viewpoint of the observer (driver) and display is not fixed in the HUD.

It is required for a conventional mixed reality presentation apparatus in which the positional relationship between the display and viewpoint is not fixed to measure the position and orientation of a display screen in the real scene and the position of the observer with respect to the display screen so as to attain registration (for example, refer to Japanese Patent Laid-Open No. 2000-276613 (patent reference 1)).

On the other hand, as for measurement of the position and azimuth of a vehicle, a vehicle measurement apparatus based on a GPS (Global Registration System) and inertial navigation is used in conventional car navigation systems.

A device described in patent reference 1 is premised on use of a display unit held by a hand, and assumes use of a magnetic sensor or ultrasonic sensor to measure the position and orientation of the display unit. Hence, this patent reference does not describe any method of measuring a vehicle which moves over a broad range.

Since the method described in non-patent reference 2 is that for measuring the head position of a person who can take an arbitrary position and orientation, its solution has a high degree of freedom, and a wrong estimated value is often output.

Since the method described in non-patent reference 2 executes a detection process for all indices which may be included in a view volume of the video camera, even when there is an index which is not observed on an image since it is occluded behind another object in the real scene, the detection process of that index is executed, and causes a detection error of the index, thus outputting the estimated values of a wrong position and orientation.

The vehicle measurement apparatus based on the GPS and inertial navigation has poor precision, and can hardly be used in applications such as travel direction indication at a crossing, advance indication of a lane direction, and the like, in which accurate registration with the real scene is indispensable.

The present invention has been made in consideration of the above problems, and has as its object to provide a technique for superimposing navigation information in a vehicle at an appropriate position on a real scene.

The position and orientation of an image sensing unit (to be also referred to as a camera hereinafter) such as a camera used to sense a real space must be measured in a mixed reality system which displays a real space and virtual space together. As a prior art associated with such technique, a method of correcting a measurement error of a position/orientation sensor that measures the position and orientation of a camera using a marker whose position is known and which is arranged in the real space or a feature point in a real space whose position is known (the marker and feature points will be generally referred to as an index hereinafter) is available (for example, refer to Japanese Patent Laid-Open No. 11-084307 (patent reference 2), Japanese Patent Laid-Open No. 2000-041173 (patent reference 3), and Japanese Patent Application No. 2000-354230 (patent reference 4)).

In the prior arts associated with this method, although they use different calculation principles, means, and steps, the position and orientation of a camera are obtained on the basis of information obtained from a position/orientation sensor of six degree of freedom, which is used to measure the position and orientation of the camera, information of indices whose positions are known and which are arranged in a real space, and information obtained by capturing these indices by the camera.

In these methods, as one of means for determining which of indices arranged in the real space corresponds to an index detected from an image, determination means which compares the coordinate position of an index detected from an image with that of an index on an image plane, which is obtained by projection based on the position and orientation measurement values, and determines indices which have a smaller distance as those which correspond to each other is used.

Assume that the "indices used to correct measurement errors of the position/orientation sensor" are arranged on the side surfaces of a tower-like object in various directions with respect to a real space where the tower-like object is present, as shown in FIG. 11.

Referring to FIG. 11, reference numeral 5201 denotes a camera used to sense such real space; 5202, a three-dimensional (3D) position/orientation sensor used to roughly measure the position and orientation of the camera 5201; 5203 and 5204, indices used to correct measurement errors of the 3D position/orientation sensor 5202; and 5205, a tower-like object where the indices 5203 and 5204 are arranged. Furthermore, the camera 5201 is movable around the tower-like object 5205, and may sense all side surfaces of the tower-like object 5205.

In such case, the tower-like object 5205 may be sensed from a position nearly perpendicular to a given side surface of the tower-like object 5205, as shown in FIG. 12. In FIG. 12, reference numeral 5300 denotes an image (image sensing frame) sensed by the camera 5201; and 5301, the index 5203 (FIG. 11) which appears in the image. Reference numeral 5302 denotes a coordinate position on the image sensing frame, which is obtained by projecting and calculating the 3D position of the index 5203 on the image plane of the sensed image 5300 on the basis of the position and orientation of the camera 5201 measured by the 3D position/orientation sensor 5202; and 5303, a coordinate position on the image sensing frame, which is obtained by projecting and calculating the 3D position of the index 5204 onto the image plane of the sensed image 5300.

If the position and orientation measurement values of the 3D position/orientation sensor 5202 are free from any errors, the coordinate position 5302 and the coordinate position of the image 5301 originally indicate the same coordinate position. However, in practice, since the position and orientation measurement values include an error, they do not indicate the same position. In the prior art, as means for determining which of indices which are actually arranged corresponds to an index (5301 in FIG. 12) detected from a sensed image, the distance between the coordinate value of an index detected from an image, and that of the index on a screen, which is calculated based on the position and orientation measurement values is used. For this reason, in the example shown in FIG. 12, since the distance between the coordinate position 5303 and the coordinate position of the image 5301 is smaller than that between the coordinate position 5302 and the coordinate position of the Image 5301 due to the influence of sensor errors, 5301 and 5303 are determined as corresponding indices. Since 5303 is a point obtained by projecting the index arranged on the back side of this tower-like object 5205, the above result means wrong correspondence.

It is, therefore, another object of the present invention to accurately identify which of indices arranged in a real space corresponds to an index detected from an image.

SUMMARY OF THE INVENTION

In order to achieve the above object, for example, an image display apparatus of the present invention comprises the following arrangement.

That is, an image display apparatus which comprises a display device that displays an image to be presented to a passenger on a vehicle on a front windshield portion of the vehicle, comprises:

vehicle measurement unit adapted to measure a position and azimuth of the vehicle on a world coordinate system;

head measurement unit adapted to measure a position of a head of the passenger on the vehicle on a coordinate system defined in the vehicle; and control unit adapted to control the display device to display the image at a position according to the position and azimuth of the vehicle measured by said vehicle measurement unit, and the position of the head measured by said head measurement unit, on the front windshield portion.

In order to achieve the above object, for example, a measurement apparatus of the present invention comprises the following arrangement.

That is, a measurement apparatus which is mounted on a vehicle and is used to measure a position and azimuth of the vehicle on a world coordinate system, comprisies:

external world image sensing unit adapted to sense an image of an external world of the vehicle;

position calculation unit adapted to calculate positions of indices in the image, which are included in the image of the external world sensed by said external world image sensing unit; and position/azimuth measurement unit adapted to measure the position and azimuth of the vehicle on the world coordinate system on the basis of the positions of the indices in the image calculated by said position calculation unit.

In order to achieve the above object, for example, a measurement apparatus of the present invention comprises the following arrangement.

That is, a measurement apparatus which measures a position and orientation of an image sensing device or an object sensed by the image sensing device by detecting indices on an image of the object sensed by the image sensing device, comprises:

an index selection unit adapted to select indices which are to be observed on the sensed image without being occluded, wherein the position and orientation of the image sensing device or the object sensed by the image sensing device are measured on the basis of information of the selected indices.

In order to achieve the above object, for example, an image display method of the present invention comprises the following arrangement.

That is, an image display method executed by an image display apparatus which comprises a display device that displays an image to be presented to a passenger on a vehicle on a front windshield portion of the vehicle, comprises:

a vehicle measurement step of measuring a position and azimuth of the vehicle on a world coordinate system;

a head measurement step of measuring a position of a head of the passenger on the vehicle on a coordinate system defined in the vehicle; and a control step of controlling the display device to display the image at a position according to the position and azimuth of the vehicle measured in the vehicle measurement step, and the position of the head measured in the head measurement step, on the front windshield portion.

In order to achieve the above object, for example, a measurement method of the present invention comprises the following arrangement.

That is, a measurement method which is mounted on a vehicle and is used to measure a position and azimuth of the vehicle on a world coordinate system, comprises:

an external world image sensing step of sensing an image of an external world of the vehicle using an image sensing device;

a position calculation step of calculating positions of indices in the image, which are included in the image of the external world sensed in the external world image sensing step; and a position/azimuth measurement step of measuring the position and azimuth of the vehicle on the world coordinate system on the basis of the positions of the indices in the image calculated in the position calculation step.

In order to achieve the above object, for example, a measurement method of the present invention comprises the following arrangement.

That is, a measurement method which measures a position and orientation of an image sensing device or an object sensed by the image sensing device by detecting indices on an image of the object sensed by the image sensing device, comprises:

an index selection step of selecting indices which are to be observed on the sensed image without being occluded, wherein the position and orientation of the image sensing device or the object sensed by the image sensing device are measured on the basis of information of the selected indices.

In order to achieve the above object, for example, an information processing method of the present invention comprises the following arrangement.

That is, an information processing method which comprises a detection step of detecting a position of an index in a sensed image sensed by image sensing unit adapted to sense an image of a real space where the index is laid out, and a first calculation step of calculating a coordinate position of the index upon projecting the index in the real space onto the sensed image on the basis of the position of the index in the real space and a position and orientation of the image sensing unit when at least one of the position of the index in the real space and the position and orientation of the image sensing unit is obtained based on a measurement, and executes a process for determining correspondence between indices at coordinate positions with a smaller distance on the basis of coordinate positions of indices detected in the detection step and the coordinate position calculated in the first calculation step on the sensed image, comprises:

a second calculation step of calculating a value using a normal vector to an index of interest, and a visual axis vector of the image sensing unit; and a determination step of determining, on the basis of a range of the value calculated in the second calculation step, whether or not the process for calculating the coordinate position of the index of interest on the sensed image in the first calculation step is to be executed, wherein when it is determined in the determination step that the process for calculating the coordinate position of the index of interest on the sensed image in the first calculation step is to be executed, the process for determining correspondence between indices at coordinate positions with a smaller distance is executed based on the coordinate position of the index of interest calculated in the first calculation step and the coordinate positions of the indices detected in the detection step.

In order to achieve the above object, for example, an information processing apparatus of the present invention comprises the following arrangement.

That is, an information processing apparatus which comprises image sensing unit adapted to sense an image of a real space where an index is laid out, detection unit adapted to detect a position of the index in a sensed image sensed by the image sensing unit, and first calculation unit adapted to, when at least one of a position of an index in the real space and a position and orientation of the image sensing unit is obtained based on a measurement, calculating a coordinate position of the index upon projecting the index in the real space onto the sensed image on the basis of the position of the index in the real space and the position and orientation of the image sensing unit, and executes a process for determining correspondence between indices at coordinate positions with a smaller distance on the basis of coordinate positions of indices detected by the detection unit and the coordinate position calculated by the first calculation unit, on the sensed image, comprises:

second calculation unit adapted to calculate a value using a normal vector to an index of interest, and a visual axis vector of the image sensing unit; and determination unit adapted to determine, on the basis of a range of the value calculated by said second calculation unit, whether or not the process for calculating the coordinate position of the index of interest on the sensed image by the first calculation unit is to be executed, wherein when said determination unit determines that the process for calculating the coordinate position of the index of interest on the sensed image by the first calculation unit is to be executed, the process for determining correspondence between indices at coordinate positions with a smaller distance is executed based on the coordinate position of the index of interest calculated by the first calculation unit and the coordinate positions of the indices detected by the detection unit.

In order to achieve the above object, for example, an identification method of the present invention comprises the following arrangement.

That is, an identification method of an index used to measure a position and orientation of an image sensing device for sensing an image of a real space, comprises:

a position/orientation measuring step of measuring roughly a position and orientation of the image sensing device;

an image sensing step of sensing an image of a real space including an index using the image sensing device;

a first image coordinate calculation step of calculating coordinate of the index, which is included in the image of the real space obtained in the image sensing step, in the obtained image; and a second image coordinate calculation step of calculating a position of the index in a sensed image sensed by the image sensing device, whose position and orientation are obtained in the position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the position/orientation measuring step and a normal vector of the index.

In order to achieve the above object, for example, an identification method of the present invention comprises the following arrangement.

That is, an identification method of an index used to measure a position and orientation of an object in a real space, comprises:

a position/orientation measuring step of measuring roughly a position and orientation of the object;

an image sensing step of sensing an image of the object using an image sensing device, which is fixed in position;

a first image coordinate calculation step of calculating coordinate of an index, which is included in the image of the object obtained in the image sensing step, in the obtained image; and a second image coordinate calculation step of calculating a position of the index in a sensed image sensed by the image sensing device, on the basis of position and orientation are obtained in the position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the position/orientation measuring step and a normal vector of the index.

In order to achieve the above object, for example, an identification method of the present invention comprises the following arrangement.

That is, an identification method of an index used to measure a position and orientation of an object in a real space, comprises:

a first position/orientation measuring step of measuring roughly a position and orientation of the object;

a second position/orientation measuring step of measuring roughly a position and orientation of an image sensing device which senses the object;

an image sensing step of sensing an image of the object using the image sensing device;

a first image coordinate calculation step of calculating coordinate of an index, which is included in the image of the object obtained in the image sensing step, in the obtained image; and a second image coordinate calculation step of calculating a position of the index in a sensed image sensed by the image sensing device, on the basis of a position and orientation of the object with reference to the image sensing device, or of the image sensing device with reference to the object, which is obtained in the first and second position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the second position/orientation measuring step, and a normal vector of the index obtained in the first position/orientation measuring step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 shows the contents of a file that records index information data;

DETAILED DESCRIPTION OF THE PREFERRED EMBODIMENTS

Preferred embodiments of the present invention will now be described in detail in accordance with the accompanying drawings.

[First Embodiment]

Figure 1:
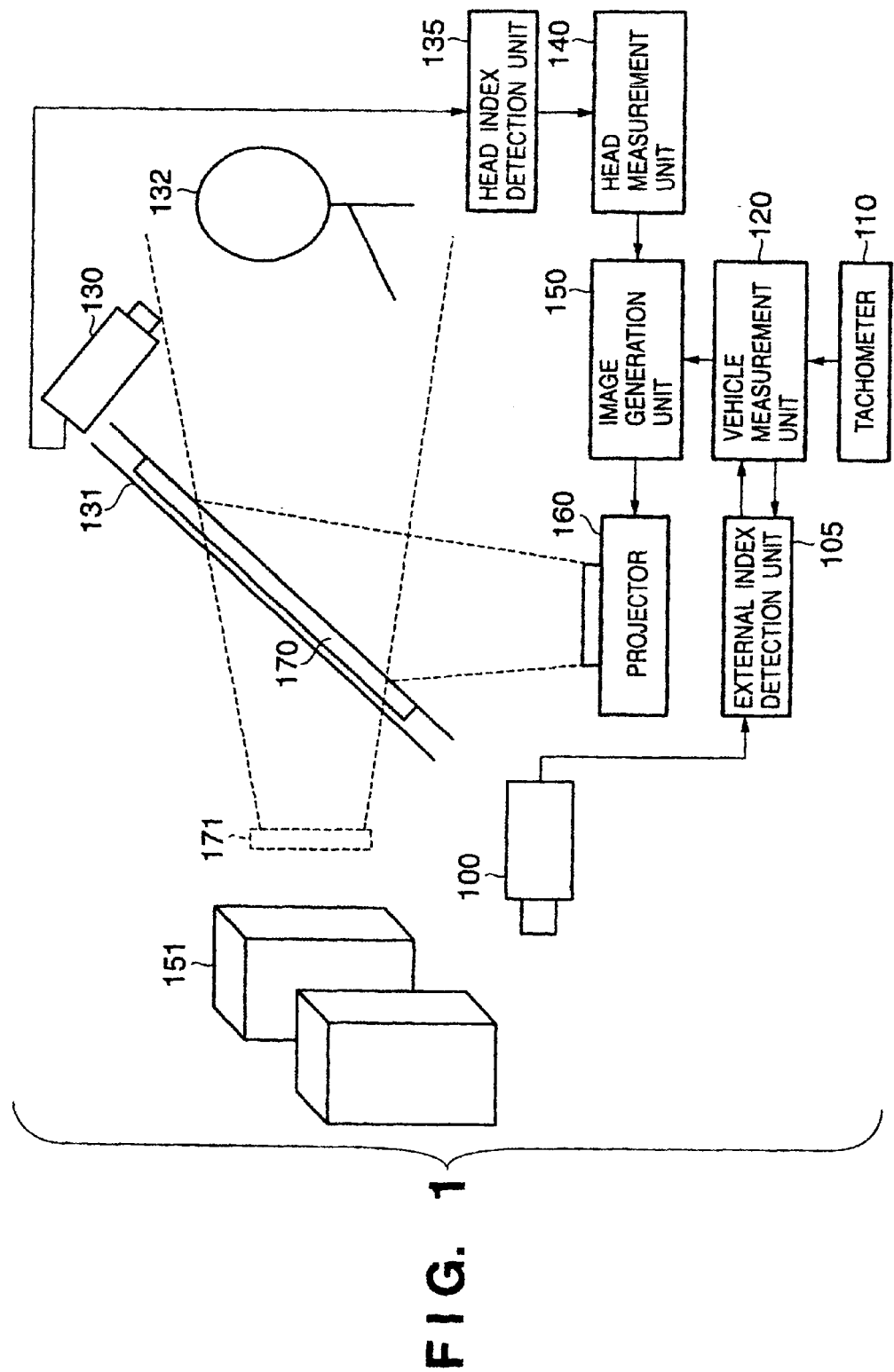
FIG. 1 is a block diagram showing the functional arrangement of an image display apparatus according to the first embodiment of the present invention, which is mounted on a vehicle.

FIG. 1 is a block diagram showing the functional arrangement of an image display apparatus according to this embodiment, which is mounted on a vehicle. The image display apparatus of this embodiment comprises an external image sensing camera 100, external index detection unit 105, tachometer 110, vehicle measurement unit 120, passenger image sensing camera 130, head index detection unit 135, head measurement unit 140, image generation unit 150, projector 160, and combiner 170.

A passenger 132 of the vehicle (in this embodiment, the passenger is also a driver of the vehicle) can visually observe an object 151 of an external world via a front windshield portion 131, and can also visually observe an image indicating navigation information which is displayed on the combiner 170 attached to the front windshield portion 131 and is generated by a process to be described later of the image display apparatus. That is, the passenger 132 can visually observe the navigation information superimposed on the object 151 of the external world.

Figure 9:
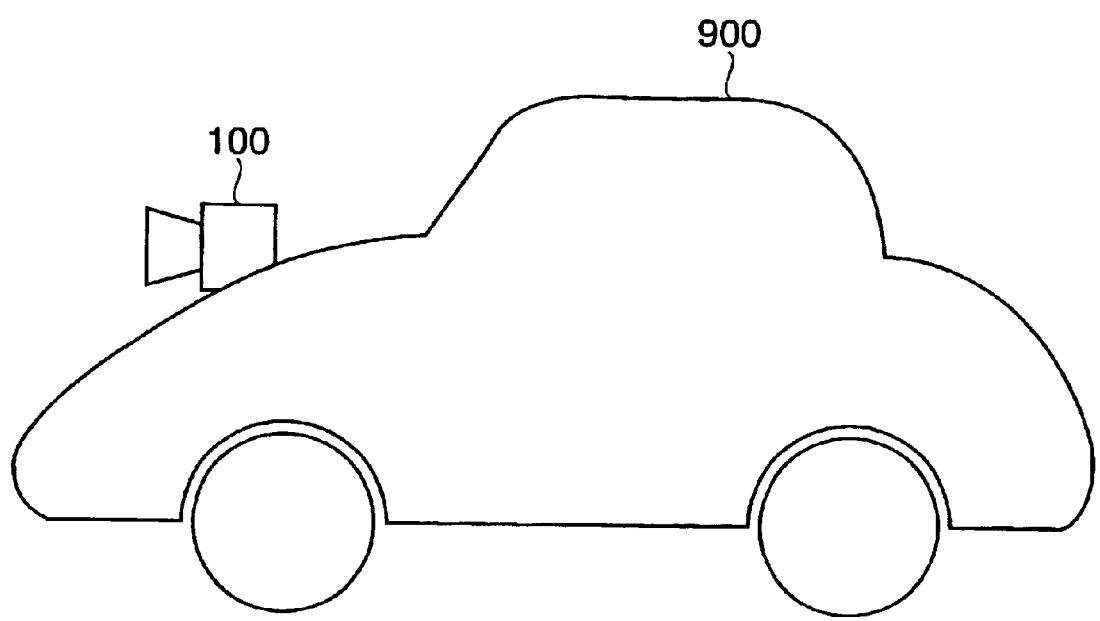
FIG. 9 shows an external image sensing camera 100 mounted on a hood of a vehicle 900.

Vehicle measurement means formed by the external image sensing camera 100, external index detection unit 105, tachometer 110, and vehicle measurement unit 120 will be explained below. The external image sensing camera 100 is mounted on the hood of the vehicle to face forward with respect to the vehicle. The camera 100 senses an actual scene of the external world outside the vehicle, and outputs the sensed image to the external index detection unit 105. FIG. 9 shows the external image sensing camera 100 mounted on the hood of a vehicle 900. The external index detection unit 105 receives the sensed image output from the external image sensing camera 100, detects external indices (to be described later) set in the real scene from that image, and outputs the position (coordinates) of the detected external indices in the image to the vehicle measurement unit 120. The tachometer 110 is connected to the right and left rear wheels of the vehicle to measure the rotational velocities of the respective wheels, and outputs the measurement results to the vehicle measurement unit 120. The vehicle measurement unit 120 receives the image coordinate of the external indices output from external index detection unit 105, and the rotational velocities of the respective wheels output from the tachometer 110, measures the position and azimuth of the vehicle on the world coordinate system based on these velocities, and outputs the measurement results to the image generation unit 150.

Head measurement means formed by the passenger image sensing camera 130, head index detection unit 135, and head measurement unit 140 will be described below. The passenger image sensing camera 130 is mounted on the upper portion of the front windshield portion 131 to face the head of the passenger 132, senses an image of the head, and outputs the sensed image to the head index detection unit 135. The head index detection unit 135 receives the sensed image output from the passenger image sensing camera 130, detects head indices (to be described later) set on the head of the passenger 132 from the image, and outputs the position (coordinates) of the detected head indices in the image to the head measurement unit 140. The head measurement unit 140 receives the image coordinate positions of the head indices output from the head index detection unit 135, measures the position of the head of the passenger 132 on a coordinate system (to be described later) defined within the passenger room on the basis of the received image coordinate position, and outputs the result to the image generation unit 150.

The image generation unit 150 as control means will be described below. The image generation unit 150 receives the position and azimuth of the vehicle from the vehicle measurement unit 120, and also the head position of the passenger 132 from the head measurement unit 140, and generates a display image so that the passenger can observe an image indicating predetermined navigation information, which is superimposed on a predetermined position (on the front surface of the objects 151 (the surface on the passenger 132 side) in the example of FIG. 1) of the real scene. The image generation unit 150 outputs the generated image to the projector 160.

A display device as the projector 160 will be described below. The projector 160 is set below the front windshield portion 131, receives the display image output from the image generation unit 150, and projects it toward the combiner 170. The combiner 170 is arranged on the front windshield portion 131. The image projected by the projector 160 is reflected on the surface of the combiner 170, and the passenger 132 can observe an image which includes the image indicating the navigation information as a virtual image 171.

Figure 2:
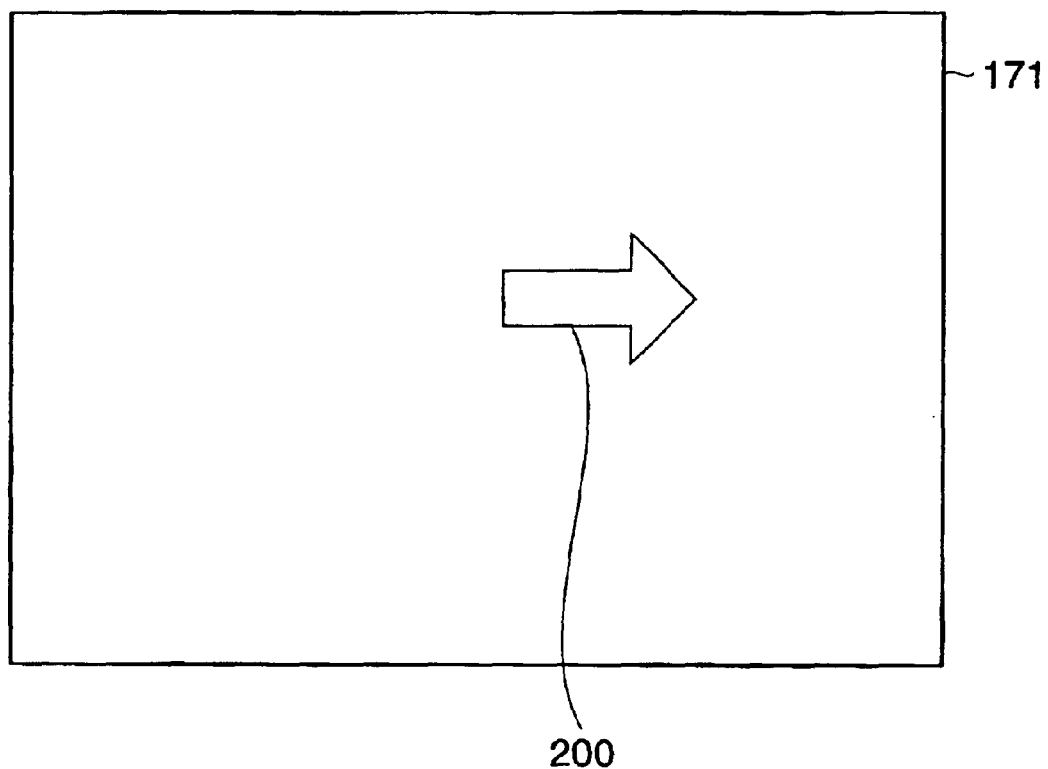
FIG. 2 shows an example of a virtual image 171.
Figure 3:
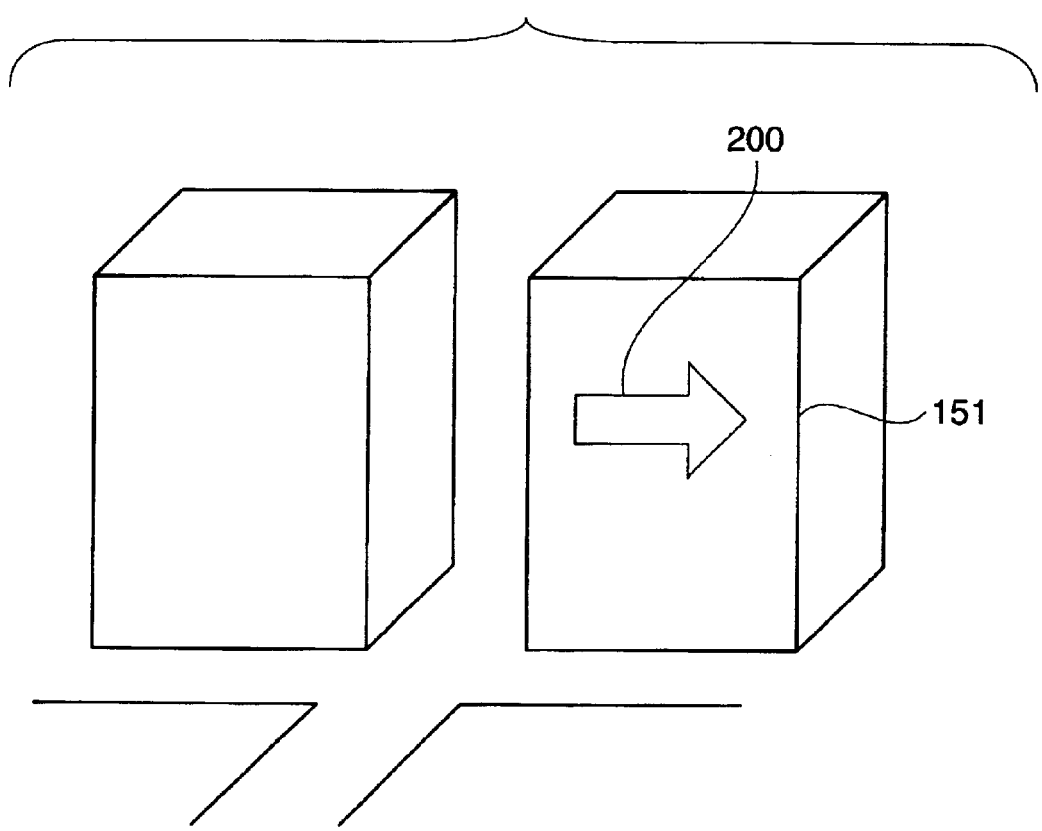
FIG. 3 shows the state of a front windshield portion observed by a passenger 132.

FIG. 2 shows an example of the virtual image 171. In the example of FIG. 2, an arrow 200 is displayed as navigation information. The virtual image 171 in FIG. 2 is seen through except for a region of the arrow image 200. FIG. 3 shows the state of the front windshield portion to be observed by the passenger 132. As shown in FIG. 3, the passenger 132 can observe the object 151 of the external world via the front windshield portion 131, and can also observe the virtual image 171, i.e., the arrow image 200, which is superimposed on the object 151.

The vehicle measurement means, head measurement means, control means, and display device will be described in more detail hereinafter. Prior to the description, principal variables used in the following description will be explained.

Σ: a coordinate system. For example, $\Sigma_e$ represents a coordinate system defined by e.

x: a scalar value that represents an x-coordinate. For example, $^{e1}x_{e2}$ indicates the x-coordinate of e2 on coordinate system $\Sigma_{e1}$.

y: a scalar value that represents a y-coordinate. For example, $^{e1}y_{e2}$ indicates the y-coordinate of e2 on coordinate system $\Sigma_{e1}$.

z: a scalar value that represents a z-coordinate. For example, $^{e1}z_{e2}$ indicates the z-coordinate of e2 on coordinate system $\Sigma_{e1}$.

r: a ternary vector that represents a position. For example, $^{e1}r_{e2}$ indicates the position of e2 on coordinate system $\Sigma_{e1}$.

p: a binary vector that represents an image position. For example, $^{I}p_{e2}$ indicates the position of e2 in image I.

R: a 3×3 matrix that represents an orientation. For example, $^{e1}R_{e2}$ indicates the orientation of e2 on coordinate system $\Sigma_{e1}$.

φ: a ternary vector that represents an orientation expressed by an Euler angle.

ω: a ternary vector that represents an angular velocity about each axis.

b: a real scene. $\Sigma_b$ represents a real scene coordinate system (world coordinate system).

w: a vehicle 10. $\Sigma_w$ represents a vehicle coordinate system.

u: the head of the passenger 132. $\Sigma_u$ represents a head coordinate system.

c1: the external image sensing camera 100. $\Sigma_{c1}$ represents an external image sensing camera coordinate system.

c2: the passenger image sensing camera 130. $\Sigma_{c2}$ represents a passenger image sensing camera coordinate system.

d: a virtual image plane. $\Sigma_d$ represents a virtual image plane coordinate system.

I: a sensed image. Coordinate system $\Sigma_I$ represents an image coordinate system (two dimensions).

g: an object on which navigation information is to be superimposed (e.g., the object 151 of the external world).

q: an image to be displayed as navigation information (e.g., the arrow 200).

ζ: a scalar value that represents an azimuth angle (an angle with respect to the y-axis in the x-y plane). $^{b}\zeta_w$ represents the azimuth angle of the vehicle in the real scene.

x': a scalar value that represents an x-velocity component.

y': a scalar value that represents a y-velocity component.

ζ': a scalar value that represents an azimuth angular velocity.

t: a time. For example, $r_w(t)$ indicates the position of the vehicle at time t.

k: an integer that represents a sample time. For example, $t_k$ is a time in the k-th process.

Δt: an infinitesimal interval between sample times. That is, $t_{k+1}=t_k+\Delta t$.

m: an external index 101. $m_i$ indicates the i-th detected external index.

M: the total number of external indices detected on image $I_1$.

n: a head index 133. $n_i$ indicates the i-th detected head index.

N: the total number of head indices detected on image $I_2$.

ψ': the rotational angular velocity (measured value) of a wheel.

v: a scalar value that represents the velocity of the vehicle.

A: a distance from the middle point of the right and left rear wheels to each of the right and left rear wheels, and this value is known.

B: the diameter of the wheel, and this value is known.

$a_1$: a scalar value that represents the focal length of the external image sensing camera 100. This value is known.

$a_2$: a scalar value that represents the focal length of the passenger image sensing camera 130. This value is known.

$y_k$: an observation vector.

$y^*_k$: an estimated value of the observation vector.

$x_k$: a state vector.

$x^*_k$: an estimated value of the state vector.

$f_k(c_k)$: a state equation.

$h_k(x_k)$: an observation equation.

$K_k$: a Kalman gain.

The following explanation will be given under the condition that respective coordinate systems are defined as follows. That is, coordinate system $\Sigma_b$ of the real scene serving as a reference assumes origin $^bO$ at an appropriate position on a horizontal plane, $^bX$- and $^bY$-axes in orthogonal directions in the horizontal plane, and $^bZ$-axis in a direction normal to the horizontal plane. Vehicle coordinate system $\Sigma_w$ assumes origin $^wO$ at an appropriate position on the vehicle, and $^wX$-axis in the left-to-right direction, $^wY$-axis in the back-to-forth direction, and $^wZ$-axis in the down-to-up direction upon sitting on the driver's seat.

Head coordinate system $\Sigma_u$ assumes origin $^uO$ at the middle point of the two eyes of the passenger 132, $^uX$-axis in a direction from the left eye to the right eye, $^uY$-axis in a direction that connects the middle point of the two eyes and a nose, and $^uZ$-axis in the front direction of the passenger 132. Each of external image sensing camera coordinate system $\Sigma_{c1}$ and passenger image sensing camera coordinate system $\Sigma_{c2}$ assumes $^cZ$-axis pointing ahead of the optical axis, $^cX$-axis in the left-to-right direction of an image, and $^cY$-axis in the up-to-down direction of the image. Also, virtual image plane coordinate system $\Sigma_d$ assumes origin $^dO$ on a virtual image plane projected by the projector, $^dX$-axis from the right-to-left direction toward the virtual image plane, $^dY$-axis in the up-to-down direction, and $^dZ$-axis in a direction normal to a virtual image plane.

<Vehicle Measurement Means>

Figure 4:
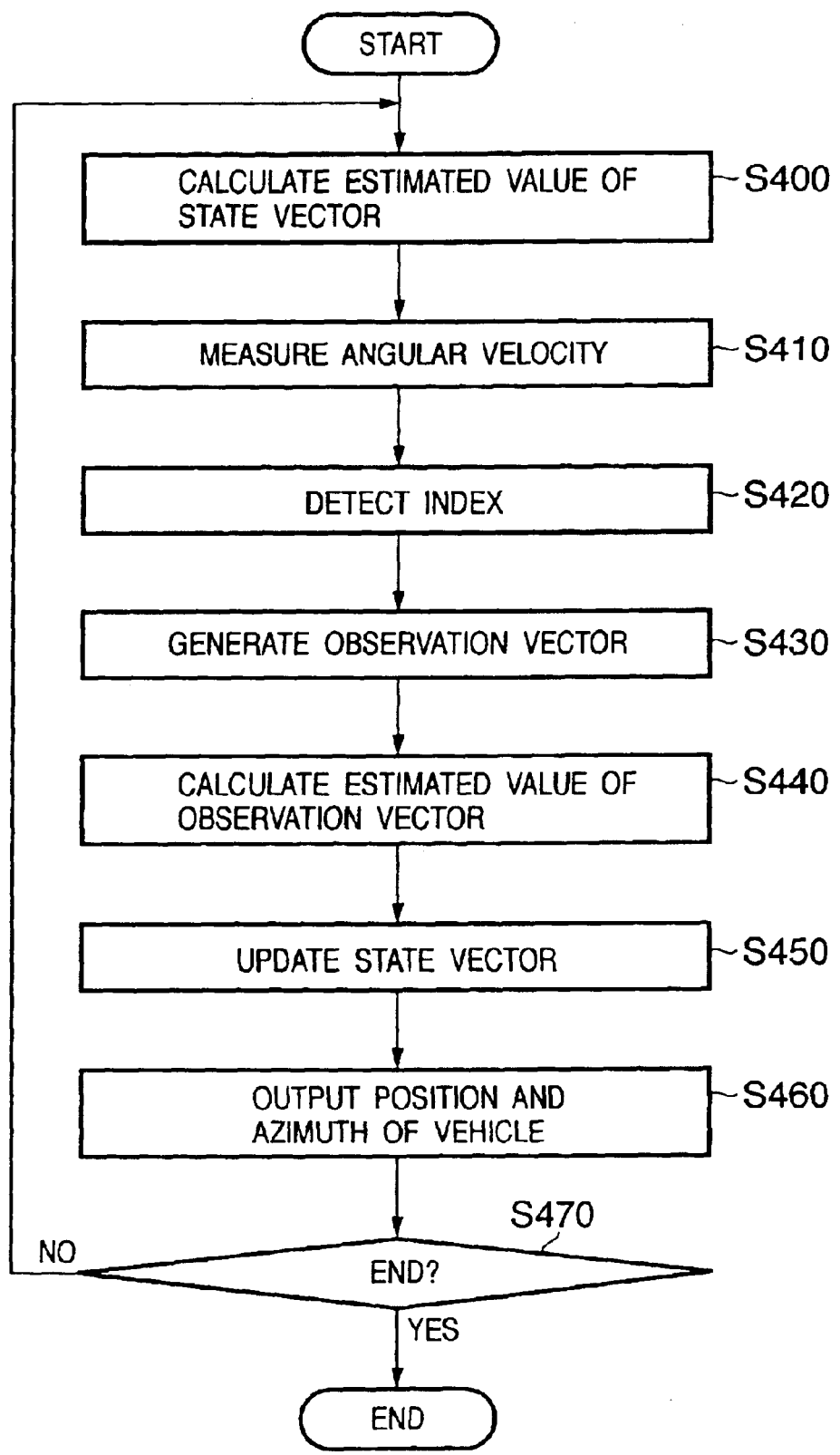
FIG. 4 is a flow chart showing the process to be executed by vehicle measurement means.

FIG. 4 is a flow chart showing the process to be executed by the vehicle measurement means. The process of the vehicle measurement means will be explained below with reference to FIG. 4. The vehicle measurement is done according to the scheme of an Extended Kalman Filter.

In the following description, state vector $x_k$ (six dimensions) of the Extended Kalman Filter is defined as a vector as a sequence of the x-coordinate position, y-coordinate position, and azimuth angle of the vehicle on real scene coordinate system $\Sigma_b$ at time $t_k$ and their time derivative values.

$$x_k=[^bx_w(t_k)\,^by_w(t_k)\,^b\zeta_w(t_k)\,^bx'_w(t_k)\,^by'_w(t_k)\,^b\zeta'_w(t_k)]^T \tag{1}$$

In step S400, the vehicle measurement unit 120 calculates estimated value $x^*_k$ of the state vector at time $t_k$ by substituting state vector $x_{k-1}$ at time $t_{k-1}$ in state equation $f_k(x_k)$ of the Extended Kalman Filter. Under the assumption that the vehicle moves at an equal velocity between respective sample times, state equation $f_k(x_k)$ can be defined by:

$$x_{k+1}^* = f_k(x_k) = \begin{bmatrix} {}^b x_w(t_k) + {}^b x'_w(t_k) \cdot \Delta t \\ {}^b y_w(t_k) + {}^b y'_w(t_k) \cdot \Delta t \\ {}^b \zeta_w(t_k) + {}^b \zeta'_w(t_k) \cdot \Delta t \\ {}^b x'_w(t_k) \\ {}^b y'_w(t_k) \\ {}^b \zeta'_w(t_k) \end{bmatrix} \quad (2)$$

In step S410, the tachometer 110 measures the rotational velocities of he right and left rear wheels. The vehicle measurement unit 120 stores these pieces of information as rotational velocities $\psi'_R(t_k)$ and $\psi'_L(t_k)$ at time $t_k$.

In step S420, the external index detection unit 105 detects image coordinates ${}^{I1}p_{mi}$ (i=1, 2, ..., M) of external indices $m_i$ on input image $I_1$ input from the external image sensing camera 100. Note that the external indices mean portions, which are registered in advance in the image display apparatus as indices to be used, of characteristic portions of various objects present in the external world, and include, for example, the corners of buildings, text on signboards, and the like. Details of the external indices and their detection process will be described later. The vehicle measurement unit 120 stores detected image coordinates ${}^{I1}p_{mi}(t_k)$ of respective indices $m_i$ at time $t_k$.

In step S430, the vehicle measurement unit 120 generates, using the information input in steps S410 and S420, observation vector $y_k$ ((2M+2) dimensions) of the Extended Kalman Filter by:

$$y_k = [{}^{I1}p_{m1}{}^T(t_k) \ldots {}^{I1}p_{mM}{}^T(t_k)\psi'_R(t_k)\psi'_L(t_k)]^T \quad (3)$$

In step S440, the vehicle measurement unit 120 calculates estimated value $y^*_k$ of the observation vector at time $t_k$ by substituting estimated value $x^*_k$ of the state vector in observation equation $h_k(x_k)$ of the Extended Kalman Filter defined by:

$$y_k^* = h_k(x_k) = \begin{bmatrix} {}^{I1}p^*_{m_1}(t_k) \\ \vdots \\ {}^{I1}p^*_{m_M}(t_k) \\ \frac{2}{B}(v_k + A \cdot {}^b\zeta'_w(t_k)) \\ \frac{2}{B}(v_k - A \cdot {}^b\zeta'_w(t_k)) \end{bmatrix} \quad (4)$$

Note that $v_k$ in equation (4) is calculated from $x_k$ using:

$$v_k = -\sin {}^b\zeta_w(t_k) \cdot {}^b x'_w(t_k) + \cos {}^b\zeta(t_k) \cdot {}^b y'_w(t_k) \quad (5)$$

Also, ${}^{I1}p^*_{mi}$ in equation (4) is the estimated value of the image coordinates of each index $m_i$ observed on input image $I_1$, and is calculated by:

$${}^{I1}p^*_{m_i}(t_k) = \begin{bmatrix} {}^{I1}x^*_{m_i}(t_k) \\ {}^{I1}y^*_{m_i}(t_k) \end{bmatrix} = \begin{bmatrix} a_1 \cdot {}^{c1}x_{m_i}(t_k)/{}^{c1}z_{m_i}(t_k) \\ a_1 \cdot {}^{c1}y_{m_i}(t_k)/{}^{c1}z_{m_i}(t_k) \end{bmatrix} \quad (6)$$

where ${}^{c1}x_{mi}$, ${}^{c1}y_{mi}$, and ${}^{c1}z_{mi}$ are the position of index $m_i$ on external image sensing camera coordinate system $\Sigma_{c1}$, and are calculated from $x_k$ by:

$${}^{c1}r_{m_i}(t_k) = \begin{bmatrix} {}^{c1}x_{m_i}(t_k) \\ {}^{c1}y_{m_i}(t_k) \\ {}^{c1}z_{m_i}(t_k) \end{bmatrix} = {}^wR_{c1}^{-1}[{}^bR_w^{-1}(t_k)\{{}^br_{m_i} - {}^br_w(t_k)\} - {}^wr_{c1}] \quad (7)$$

where ${}^br_{mi}$ is the position of index $m_i$ on real scene coordinate system $\Sigma_b$, and ${}^wr_{c1}$ and ${}^wR_{c1}$ are the position and orientation of the external image sensing camera 100 on vehicle coordinate system $\Sigma_w$, which are measured in advance. ${}^bR_w(t_k)$ is the orientation of the vehicle on real scene coordinate system $\Sigma_b$, and is calculated on the basis of ${}^b\zeta_w(t_k)$. On the other hand, ${}^br_w(t_k)$ is the position of the vehicle on real scene coordinate system $\Sigma_b$, and is calculated based on ${}^bx_w(t_k)$ and ${}^by_w(t_k)$. Assume that the tilt angle (roll and pitch angles) of the vehicle with respect to the x-y plane of real scene coordinate system $\Sigma_b$ is a constant value, and is pre-stored as a known value in this embodiment. Also, assume that z-coordinate ${}^bz_w$ of the vehicle on real scene coordinate system $\Sigma_b$ is a constant value, and is pre-stored as a known value.

In step S450, the vehicle measurement unit 120 updates the state vector on the basis of estimated value $x^*_k$ of the state vector, estimated value $y^*_k$ of the observation vector, and observation vector $y_k$ using:

$$x_k = x_k^* + K_k[y_k - y_k^*] \quad (8)$$

where Kalman gain $K_k$ is a coefficient matrix (6×(2M+2)) defined based on state equation $f_k(x_k)$, observation equation $h_k(x_k)$, and state vector $X_{k-1}$. Since the calculation method of the Kalman gain is disclosed in, e.g., Kiyoshi Nishiyama: Optimal Filtering, Baihukan, 2001, a detailed description thereof will be omitted.

In step S460, the vehicle measurement means acquires position (${}^bx_w(t_k)$, ${}^by_w(t_k)$) and azimuth ${}^b\zeta_w(t_k)$ of the vehicle from updated state vector $x_k$, and outputs them to the image generation unit 150 as the control means.

The vehicle measurement means determines in step S470 if the process is to end. If the process is to continue, k is incremented (k+1), and the processes in step S400 and subsequent steps are repeated. Note that the external index detection unit 105 and vehicle measurement unit 120 can be implemented by, e.g., a single versatile computer.

Figure 5:
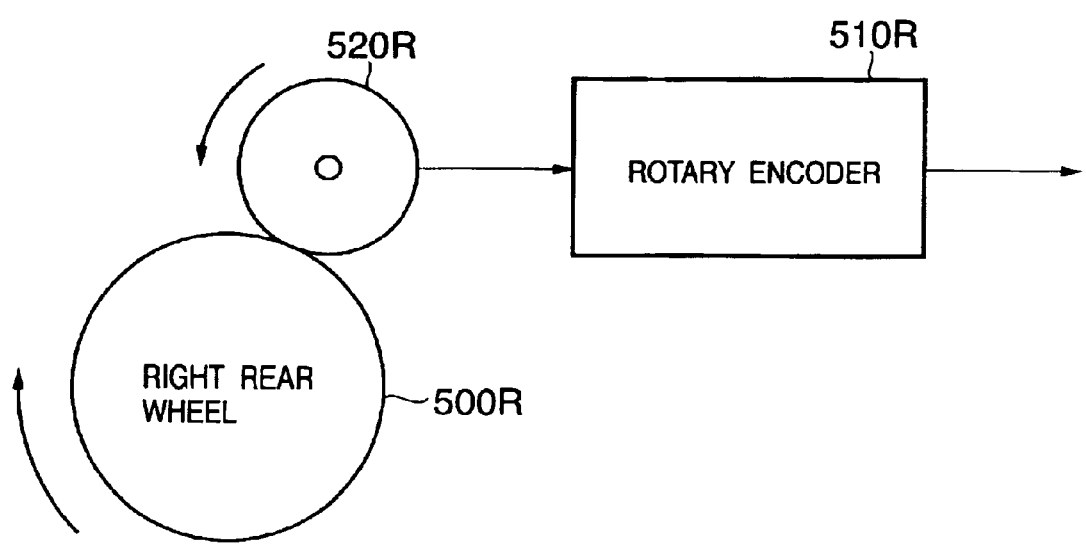
FIG. 5 is a view showing the arrangement for detecting the rotational velocity of the right rear wheel.

Details of the tachometer 110 will be described below using FIG. 5. FIG. 5 shows the arrangement for detecting the rotational velocity of the right rear wheel, and that of the left rear wheel can be detected using the same arrangement. The rotational velocity of a right rear wheel 500R is measured by a rotary encoder 510R and wheel 520R. The wheel 520R is attached to the rotational shaft of the rotary encoder 510R, and is arranged to contact the right rear wheel 500R. The rotary encoder 510R measures rotational angular velocity $\psi'_R$ of the wheel 520R, and outputs it as information that represents the rotational velocity of the right rear wheel 500R. The measurement of a left rear wheel 500L (not shown) is realized by the same arrangement, and rotational angular velocity $\psi'_L$ of a wheel 520L (not shown) is output.

Figure 6:
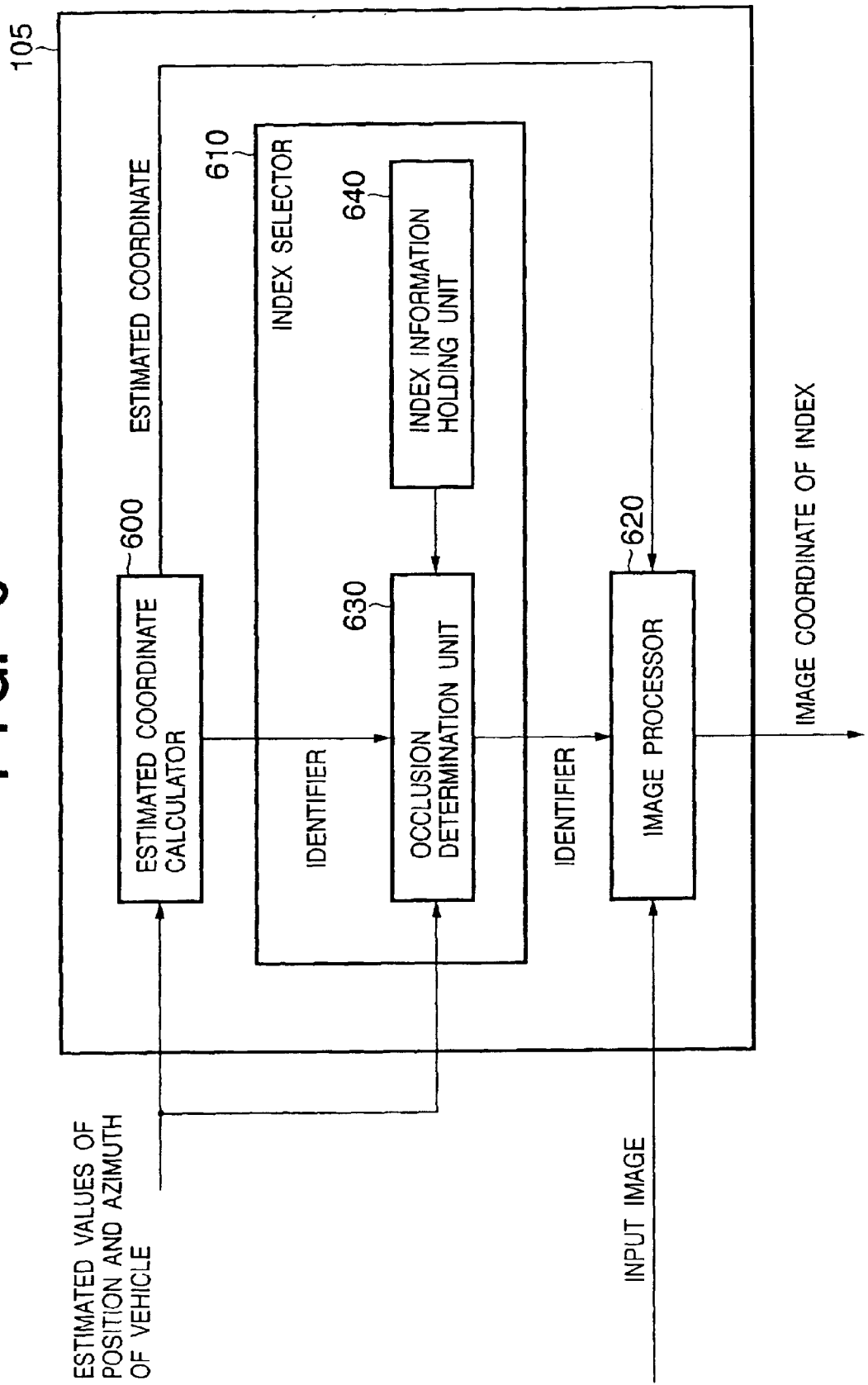
FIG. 6 is a block diagram showing the basic arrangement of an external index detection unit 105.

Details of the process in the external index detection unit 105 will be described below using FIG. 6. FIG. 6 is a block diagram showing the basic arrangement of the external index detection unit 105. The external index detection unit 105 comprises an estimated coordinate calculator 600, index selector 610, and image processor 620. The index selector 610 comprises an occlusion determination section 630 and index information holding section 640.

The estimated coordinate calculator 600 receives the estimated values of the position and azimuth of the vehicle calculated by the vehicle measurement unit 120, and calculates estimated values $^{f1}p^*_{mi}$ of image coordinates of all external indices on input image $I_1$ using equations (6) and (7). Identifiers of indices the calculated estimated values of which are included within the range of the image sensing frame are output to the occlusion determination section 630. The index information holding section 640 holds, for respective indices, the positions and azimuths of the vehicle upon sensing template images used to detect indices.

The occlusion determination section 630 determines the presence/absence of occlusion for each of indices, the estimated values, obtained from the estimated coordinate calculator 600, of which are included within the range of the image sensing frame. More specifically, when the estimated values of the position and azimuth of the vehicle calculated by the vehicle measurement unit 120 are considerably separated from those of the vehicle upon sensing a template image used to detect an index of interest, which are held by the index information holding section 640, it is determined that the index of interest is occluded. The identifier of an index, which is determined not to be occluded, is output to the image processor 620 as an object to be detected.

Note that the position and azimuth of the vehicle upon sensing a template image may be compared with the current position and azimuth of the vehicle on the basis of, e.g., the distance between two points or on the basis of the difference between the azimuth angles. Also, a common threshold value may be used to determine all indices, or different threshold values may be set for respective indices. Note that the same function can be implemented with reference to the position and orientation of the external image sensing camera 100 in place of the position and azimuth of the vehicle.

The image processor 620 detects an index selected by the index selector 610 as an index to be processed from image $I_1$ by template matching using a template image of each index, which is registered in advance. At this time, the search range is preferably limited using the estimated values $^{f1}p^*_{mi}$ of the image coordinates calculated by the estimated coordinate calculator 600.

With the aforementioned processing sequence, position ($^b x_w(t_k)$, $^b y_w(t_k)$) and azimuth $^b \zeta_w(t_k)$ of the vehicle on real scene coordinate system $\Sigma_b$ are measured.

<Head Measurement Means>

Figure 7:
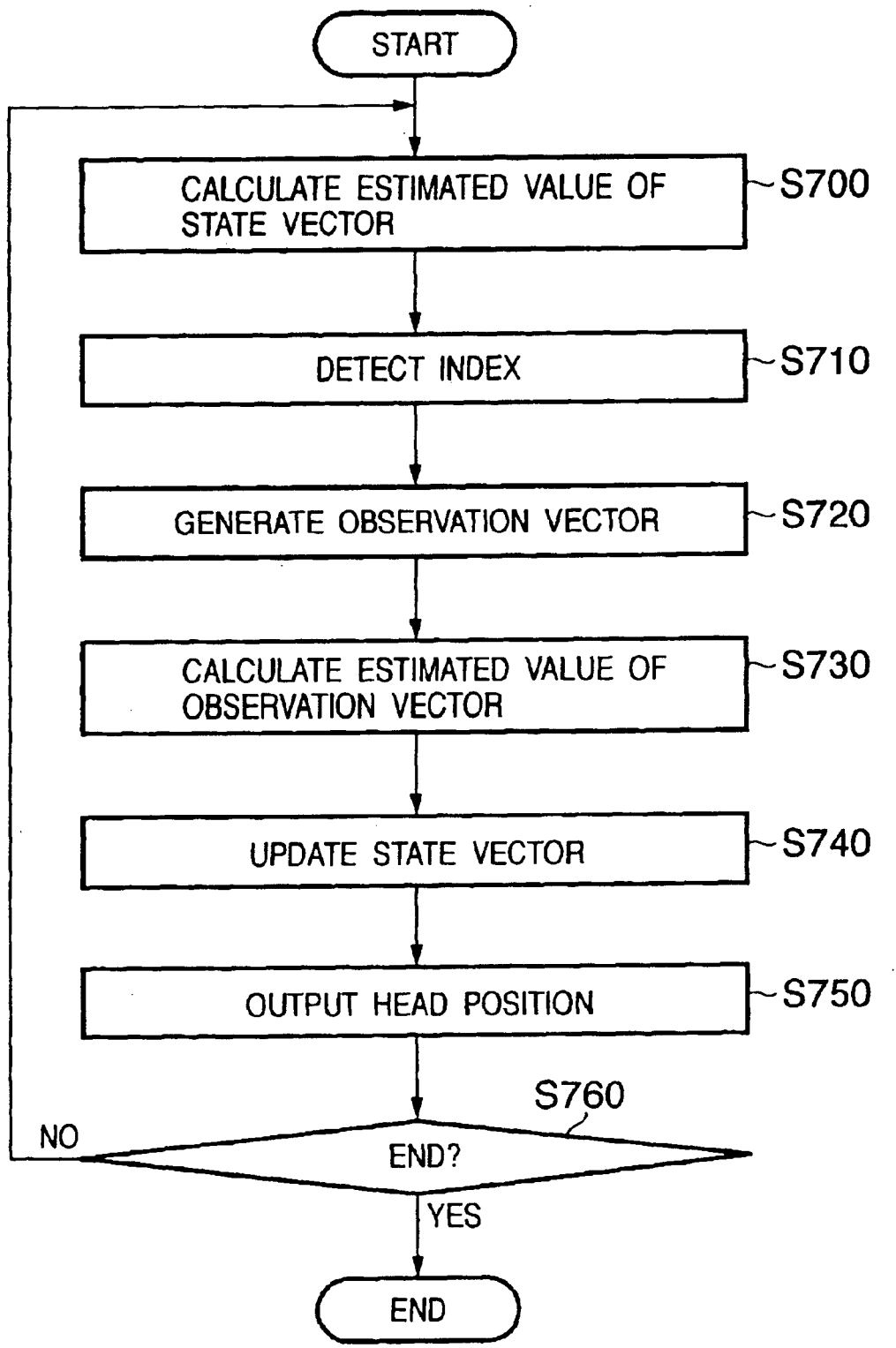
FIG. 7 is a flow chart showing the process to be executed by head measurement means.

FIG. 7 is a flow chart showing the process to be executed by the head measurement means. The process of the head measurement means will be explained below with reference to FIG. 7. The head measurement is done according to the scheme of an Extended Kalman Filter as in the vehicle measurement.

In the following description, state vector $x_k$ (12 dimensions) is defined as a vector as a sequence of position $^w r_u$, orientation $^w \phi_u$, velocity $^w r'_u$, and angular velocity $^w \omega_u$ of the passenger 132 on vehicle coordinate system $\Sigma_w$ at time $t_k$.

$$x_k = [{}^w r_m{}^T(t_k) {}^w \phi_m{}^T(t_k) {}^w r'_m{}^T(t_k) {}^w \omega_m{}^T(t_k)]^T \quad (9)$$

In step S700, the head measurement unit 140 calculates estimated value $x^*_k$ of the state vector at time $t_k$ by substituting state vector $x_{k-1}$ at time $t_{k-1}$ in state equation $f_k(x_k)$. Under the assumption that each position and orientation change at an equal velocity between respective sample times, state equation $f_k(x_k)$ can be defined by:

$$x^*_{k+1} = f_k(x_k) = \begin{bmatrix} {}^w r_u(t_k) + {}^w r'_u(t_k) \cdot \Delta t \\ {}^w \phi_u(t_k) + {}^w \phi'_u(t_k) \cdot \Delta t \\ {}^w r'_u(t_k) \\ {}^w \omega_u(t_k) \end{bmatrix} \quad (10)$$

where $\phi'$ is the time derivative value of orientation $\phi$, and can be derived as a function of orientation $\phi$ and angular velocity $\omega$, as is generally known. Since details of this process are disclosed in, e.g., Donald B. Gennery: Visual tracking of known three-dimensional objects, International Journal of Computer Vision, Vol. 7, No. 3, pp. 243–270, 1992, a description thereof will be omitted.

In step S710, the head index detection unit 135 detects image coordinates $^{f2}p_{ni}$ (i=1, 2, ..., N) of head indices $n_i$ observed on input image $I_2$ input from the passenger image sensing camera 130 using template images of respective head indices, which are registered in advance. Note that the head indices indicate eyes, nose, mouth, and the like, and their partial regions present on the head (face), which are registered in advance in the image display apparatus as indices to be used. The head measurement unit 140 stores these pieces of information as image coordinates $^{f2}p_{ni}$ of indices $n_i$ at time $t_k$. Since the process in the head index detection unit 135 is the same as that in the external index detection unit 105, a detailed description thereof will be omitted.

In step S720, the head measurement unit 140 generates observation vector $y_k$ (2N dimensions) using the information input in step S700 by:

$$y_k = [{}^{f2}p_{n_1}{}^T(t_k) {}^{f2}p_{n_2}{}^T(t_k) \ldots {}^{f2}p_{n_N}{}^T(t_k)]^T \quad (11)$$

In step S730, the head measurement unit 140 calculates estimated value $y^*_k$ of the observation vector at time $t_k$ by substituting estimated value $x^*_k$ of the state vector in observation equation $h_k(x_k)$ defined by:

$$y_k^* = h_k(x_k) = [{}^{f2}p_{n_1}{}^{*T}(t_k) {}^{f2}p_{n_2}{}^{*T}(t_k) \ldots {}^{f2}p_{n_N}{}^{*T}(t_k)]^T \quad (12)$$

where $^{f2}p^*_{ni}$ is the estimated value of the image coordinates of each index $n_i$ observed on input image $I_2$ and is calculated by:

$$^{f2}p^*_{n_i}(t_k) = \begin{bmatrix} {}^{f2}x^*_{n_i}(t_k) \\ {}^{f2}y^*_{n_i}(t_k) \end{bmatrix} = \begin{bmatrix} a_2 \cdot {}^{c2}x_{n_i}(t_k) / {}^{c2}z_{n_i}(t_k) \\ a_2 \cdot {}^{c2}y_{n_i}(t_k) / {}^{c2}z_{n_i}(t_k) \end{bmatrix} \quad (13)$$

where $^{c2}x_{ni}$, $^{c2}y_{ni}$, and $^{c2}z_{ni}$ are the coordinate positions of index $n_i$ on head image sensing camera coordinate system $\Sigma_{c2}$, and are calculated based on state vector $x_k$ using:

$$^{c2}r_{n_i}(t_k) = \begin{bmatrix} {}^{c2}x_{n_i}(t_k) \\ {}^{c2}y_{n_i}(t_k) \\ {}^{c2}z_{n_i}(t_k) \end{bmatrix} = {}^w R_{c2}^{-1} [{}^b R_u(t_k) \cdot {}^u r_{n_i} + {}^w r_u(t_k) - {}^w r_{c2}] \quad (14)$$

where $^u r_{ni}$ is the position of head index $n_i$ on head coordinate system $\Sigma_u$, $^w r_{c2}$ and $^w R_{c2}$ are the position and orientation of the passenger image sensing camera 130 on vehicle coordinate system $\Sigma_w$, which are measured in advance. Also, $^w R_u(t_k)$ is a matrix that represents the orientation of the head of the passenger 132 on vehicle coordinate system $\Sigma_w$, and is calculated based on $^w \phi_u(t_k)$.

In step S740, the head measurement unit 140 updates the state vector on the basis of observation vector $y_k$, estimated value $x^*_k$ of the state vector, estimated value $y^*_k$ of the observation vector using equation (8). Since the calculation method of Kalman gain $K_k$ is known to those who are skilled in the art, a detailed description thereof will be omitted.

In step S750, the head measurement means acquires position ${}^w r_u(t_k)$ of the head from updated state vector $x_k$, and outputs it to the image generation unit 150 as the control means.

The head measurement means determines in step S760 if the process is to end. If the process is to continue, k is incremented (k+1), and the processes in step S700 and subsequent steps are repeated. Note that the head index detection unit 135 and head measurement unit 140 can be implemented by, e.g., a single versatile computer. With the aforementioned processing sequence, position ${}^w r_u$ of the head of the passenger 132 on vehicle coordinate system $\Sigma_w$ is measured.

<Control Means>

Figure 8:
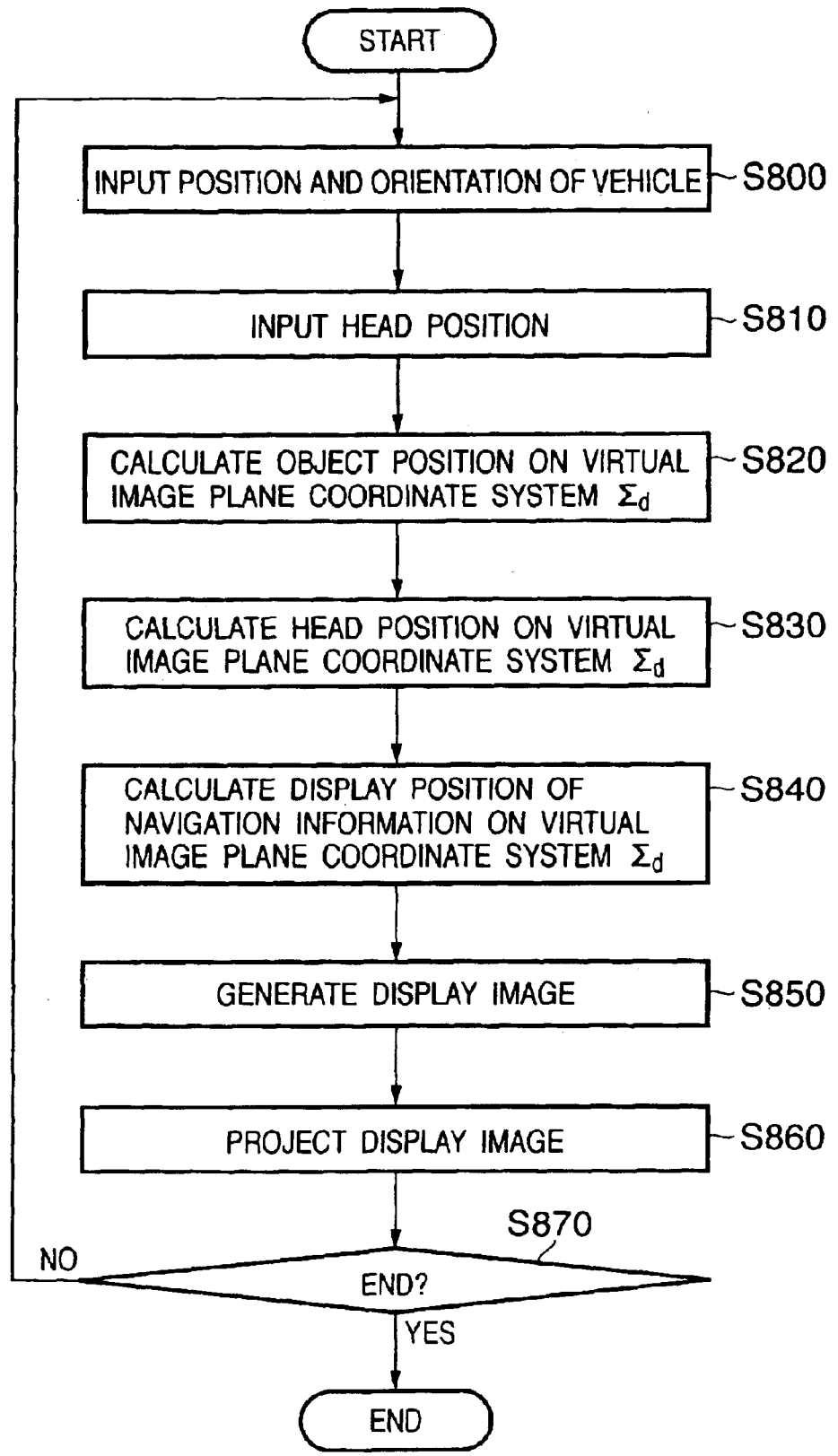
FIG. 8 is a flow chart showing the process to be executed by an image generation unit 150 as control means.

FIG. 8 is a flow chart showing the process to be executed by the image generation unit 150 as the control means. The process of the control means will be described below with reference to FIG. 8. In step S800, the image generation unit 150 receives position (${}^b x_w(t_k)$, ${}^b y_w(t_k)$) and azimuth ${}^b \zeta_w(t_k)$ of the vehicle on real scene coordinate system $\Sigma_b$, which are measured by the vehicle measurement means, and converts them into position vector ${}^b r_w$, and orientation matrix ${}^b R_w$.

In step S810, the image generation unit 150 receives position ${}^w r_u$ of the head of the passenger 132 on vehicle coordinate system $\Sigma_w$, which is measured by the head measurement means.

In step S820, the image generation unit 150 calculates position ${}^d r_g$ of object 151 to be superimposed on virtual image plane coordinate system $\Sigma_d$ by:

$${}^d r_g = {}^w R_d^{-1} \{ {}^b R_w^{-1} ({}^b r_g - {}^b r_w) - {}^w r_d \} \quad (15)$$

where ${}^b r_g$ is the position of the object 151 to be superimposed on real scene coordinate system $\Sigma_b$, and ${}^w r_d$ and ${}^w R_d$ are the position and orientation of the virtual image plane on vehicle coordinate system $\Sigma_w$, which are measured in advance.

In step S830, the image generation unit 150 calculates position ${}^d r_u$ of the head of the passenger 132 on virtual image plane coordinate system $\Sigma_d$ by:

$${}^d r_k = {}^w R_d^{-1} ({}^w r_u - {}^w r_d) \quad (16)$$

In step S840, the image generation unit 150 calculates display position ${}^d r_q$ of an image indicating navigation information (arrow 200) on virtual image plane coordinate system $\Sigma_d$ by:

$${}^d r_q = \frac{d z_u}{d z_u - d z_g} \cdot {}^d r_g - \frac{d z_g}{d z_u - d z_g} \cdot {}^d r_u \quad (17)$$

In step S850, the image generation unit 150 generates a display image so that the image indicating the navigation information (arrow 200) is displayed at position ${}^d r_q$ on the virtual image plane, and outputs it to the projector 160 as a display device.

In step S860, the projector 160 projects the generated display image toward the combiner 170.

The image generation unit 150 as the control means determines in step S870 if the process is to end. If the process is to continue, k is incremented (k+1), and the processes in step S800 and subsequent steps are repeated. Note that image generation unit 150 can be implemented by, e.g., a single versatile computer.

With the aforementioned processing sequence, display that allows the passenger to observe the image indicating navigation information (arrow 200) superimposed on the object 151 to be superimposed can be realized.

In this embodiment, in order to obtain the position and azimuth of the vehicle, the relative positional relationship between the object of the external world as an object to be superimposed, and the vehicle is directly measured in place of data using a GPS. Hence, the position and azimuth of the vehicle can be obtained with higher precision than the GPS.

In this embodiment, since the image indicating navigation information is displayed at a position in accordance with not only the position and orientation of the vehicle but also the head position of the passenger, even when the head of the passenger pitches and rolls, the image indicating navigation information can always be presented at an appropriate position with respect to the passenger.

[Second Embodiment]

In the above embodiment, the vehicle measurement unit 120 defines state equation $f_k(x_k)$ using equation (2). Since equation (2) is the state equation based on a model that allows the vehicle to freely pitch and roll, the estimated value of the position of the vehicle obtained using this equation is often largely different from an actual value. This embodiment introduces a nonholonomic constraint based on the assumption that the vehicle never skids, and sets, in place of equation (2), state equation $f_k(x_k)$ which is improved as:

$$f_k(x_k) = \begin{bmatrix} {}^b x_w(t_k) + {}^b x'_w(t_k) \cdot \Delta t \\ {}^b y_w(t_k) + {}^b y'_w(t_k) \cdot \Delta t \\ {}^b \zeta_w(t_k) + {}^b \zeta'_w(t_k) \cdot \Delta t \\ {}^b x'_w(t_k) - v_k \cdot {}^b \zeta'_w(t_k) \cdot \Delta t \cdot \cos {}^b \zeta_w(t_k) \\ {}^b y'_w(t_k) - v_k \cdot {}^b \zeta'_w(t_k) \cdot \Delta t \cdot \sin {}^b \zeta_w(t_k) \\ {}^b \zeta'_w(t_k) \end{bmatrix}^T \quad (18)$$

Note that the above equation merely considers a nonholonomic constraint in estimation of the state vector, and the dimensions themselves of the state vector do not degenerate. Thus, by importing appropriate system noise characteristics, quantity of skid of the vehicle can be considered. Hence, with the method of this embodiment, the position and azimuth of the vehicle can be estimated more accurately than both the case wherein the state equation is formulated on the condition of a perfect nonholonomic constraint, and the case of the above embodiment wherein the state equation is formulated regardless of any nonholonomic constraint. As a result, the measurement precision of the position and azimuth of the vehicle in the vehicle measurement unit 120 can be improved.

[Third Embodiment]

The tachometer 110 in the above embodiment measures the rotational velocity of the wheel using the rotary encoder. However, the arrangement of the tachometer 110 is not limited to such specific one, and any other arrangements may be adopted as long as the rotational velocity of the wheel can be measured. For example, pulse sensors attached to the two rear wheels for the purpose of, e.g., orientation control of the vehicle may be used as the tachometer 110. In this embodiment, the diameter of the rear wheel 500 can be used as the value B in equation (4) in place of the wheel 520.

Also, the same effect can be obtained by arranging the tachometer 110 by a vehicle velocity sensor and gyro sensor used in inertial navigation of a conventional car navigation system. Let $\mu$ be the vehicle velocity measured by the vehicle velocity sensor, and $\xi'$ be the azimuth angular velocity of the vehicle measured by the gyro sensor. Then, the tachometer 110 in this case derives rotational velocities $\psi'_R$ and $\psi'_L$ of the two rear wheels on the basis of the measured $\mu$ and $\xi'$ by:

$$\psi'_R = \frac{2}{B}(\mu + A\xi'), \psi'_L = \frac{2}{B}(\mu - A\xi') \tag{19}$$

and outputs the calculated velocities to the vehicle measurement unit 120.

[Fourth Embodiment]

The above embodiment uses the tachometer 110 to obtain the rotational velocities of the two wheels. Alternatively, the same effect as in the above embodiment can be obtained using data associated with a vehicle velocity measured by another sensor. For example, a vehicle velocity sensor based on rotary pulse measurement of a propeller shaft, and a gyro sensor, which are used in inertial navigation of a conventional car navigation system, may be equipped in place of the tachometer 110. In addition, the rotational velocities may be calculated based on the engine speed and the currently selected gear ratio of a transmission. In this case, the vehicle measurement unit 120 receives image coordinates $^{t_1}p_{mi}(t_k)$ of an external index detected by the external index detection unit 105, vehicle velocity $\mu(t_k)$ measured by the vehicle velocity sensor, and azimuth angular velocity $\xi'(t_k)$ measured by the gyro sensor, and measures the position and azimuth of the vehicle on the basis of these input data. The position and azimuth of the vehicle can be measured in the same sequence as in the above embodiment by defining observation vector $y_k$ and observation equation $h_k(x_k)$ as:

$$y_k = [^{t_1}p_{m_1}^T(t_k) \ldots ^{t_1}p_{m_M}^T(t_k)\mu(t_k)\xi'(t_k)]^T \tag{20}$$

$$y_k^* = h_k(x_k) = [^{t_1}p_{m_1}^{*T}(t_k) \ldots ^{t_1}p_{m_M}^{*T}(t_k)v_k \zeta'(t_k)]^T \tag{21}$$

where $v_k$ is the estimated value of the vehicle velocity and is calculated from state vector $x_k$ using equation (5).

[Fifth Embodiment]

The vehicle measurement means may be comprised of only the external image sensing camera 100, external index detection unit 105, and vehicle measurement unit 120. That is, the vehicle measurement unit 120 measures the position and azimuth of the vehicle on the basis of image coordinates $^{t_1}p_{mi}(t_k)$ of an external index input from the external index detection unit 105. In this case, the position and azimuth of the vehicle can be measured in the same sequence as in the above embodiment by defining observation vector $y_k$ and observation equation $h_k(x_k)$ as:

$$y_k = [^{t_1}p_{m_1}^T(t_k) \ldots ^{t_1}p_{m_M}^T(t_k)]^T \tag{22}$$

$$y_k^* = h_k(x_k) = [^{t_1}p_{m_1}^{*T}(t_k) \ldots ^{t_1}p_{m_M}^{*T}(t_k)]^T \tag{23}$$

[Sixth Embodiment]

The vehicle measurement means in the above embodiment has only one external image sensing camera 100, but may have a plurality of external image sensing cameras 100. In this case, the vehicle measurement unit 120 receives the image coordinates of external indices detected by a plurality of external index detection units 105, and defines observation vector $y_k$ and observation equation $h_k(x_k)$ based on them. The position and orientation of the vehicle can be obtained in substantially the same sequence as in the above embodiment, except that parameters $^w R_{c1}$, $^w r_{c1}$, and $a_1$ used in the derivation process of the observation equation assume values unique to the corresponding external image sensing cameras 100. In this way, since a larger number of index coordinates can be stably detected, the measurement precision of the position and azimuth of the vehicle can be improved.

In the above embodiment, the external image sensing camera 100 is mounted on the hood of the vehicle to face forward with respect to the vehicle. However, the mount position of the external image sensing camera 100 is not limited to such specific position as long as it has a position and direction that allow to observe external indices in the real scene. More specifically, the camera 100 may face backward or sideward or may be mounted on a fender portion, roof, or the like of the vehicle.

Likewise, the head measurement means can adopt an arrangement having a plurality of passenger image sensing cameras 130, and the measurement precision of the head position can be improved. Also, the mount position of the passenger image sensing camera 130 is not particularly limited as long as the head indices can be observed.

[Seventh Embodiment]

The head measurement means in the above embodiment measures the position of the head of the passenger 132. The head position measurement need not always be continuously made. That is, the head measurement means measures the position of the head at only a predetermined timing, and outputs the measured head position to the control means. The control means holds the latest head position input from the head measurement means, and generates an image using the held head position. Note that the predetermined timing may be the startup timing of the image display apparatus, or an arrangement that further has means for detecting an on-board timing or drive start timing of the passenger 132 may be adopted, and that detection timing may be used. Alternatively, an arrangement that further has means for inputting a passenger's instruction may be adopted, and the head measurement process may be executed at the issuance timing of the passenger's instruction.

[Eighth Embodiment]

In the above embodiment, the index selector 610 determines occlusion on the basis of the estimated values of the position and azimuth of the vehicle, which are calculated by the vehicle measurement unit 120, and the position and azimuth of the vehicle upon sensing a template image of an index. Alternatively, occlusion may be determined by other arrangements.

For example, the index information holding section 640 may hold information associated with the direction of each index, and occlusion of an index may be determined on the basis of the direction of the index and the orientation of the external image sensing camera 100.

For example, the index information holding section 640 may hold, for respective indices, normal vectors $\eta_{mi}$ indicating normal directions of indices $m_i$ as information associated with the direction of each index. The occlusion determination section 630 may calculate the orientation of the external image sensing camera 100 on the basis of the orientation of the vehicle calculated until time $t_{k-1}$, and may determine that an index of interest is occluded when an angle $-^{c1}z$-axis makes with normal vector $\eta_{mi}$ is equal to or larger than a predetermined threshold value. Note that a common threshold value may be used for all indices, or different threshold values may be set for respective indices.

With this method, an index which is obviously occluded (e.g., an index arranged on the back side of a wall) can be easily determined. Note that any other kinds of information may be used as information associated with the direction of each index.

[Ninth Embodiment]

The index selector 610 may further have shape model holding means for holding shape models of objects in the real scene, and the index information holding section 640 may hold positions $^b r_{mi}$ of respective indices $m_i$. The occlusion determination section 630 may calculate the position and orientation of the external image sensing camera 100 on the basis of the orientation of the vehicle calculated until time $t_{k-1}$. Then, depth ordering of objects other than indices in the real scene and respective indices may be determined on the basis of the shape models of objects in the real scene held in the shape model holding means and positions $^b r_{mi}$ of respective indices $m_i$ held by the index information holding section 640 based on the calculated position and orientation of the camera 100, thus determining whether or not each index is occluded.

[10th Embodiment]

The index selector 610 may also serve as the occlusion determination means of any of the above embodiments. Also, the index selector 610 need not always be equipped, and the detection process in the image processor 620 may be executed for all indices which are determined by the estimated coordinate calculator 600 to be included within the range of the image sensing plane.

[11th Embodiment]

In this embodiment, the index selector 610 further has a priority determination section which selects only indices effective for the process for measuring the position and azimuth of the vehicle in the vehicle measurement unit 120. The priority determination section receives identifiers of indices output from the occlusion determination section 630. When the total number ($N_A$) of indices received from the occlusion determination section 630 exceeds the total number ($N_B$) of indices that the image processor 620 can simultaneously detect, the priority determination section selects $N_B$ indices from $N_A$ indices, and outputs their identifiers to the image processor 620.

Selection is attained by generating a Jacobian matrix (generally called an image Jacobian) obtained by partially differentiating observation equation $h_k(x_k)$ by $x_k$ for each of combinations that select $N_B$ indices from $N_A$ indices, and selecting a combination in which the number of conditions as a result of singular value decomposition of that matrix is closest to 1. At this time, by placing a constraint that at least $N_C$ ($N_C < N_B$) indices of those detected by the image processor 620 in the process at time $t_{k-1}$ are included in combinations, a reduction of the calculation volume due to a reduction of the number of combinations, and removal of discontinuity of alignment can be effectively attained.

[12th Embodiment]

The vehicle measurement means further has GPS reception means, and supplies approximate position information and azimuth information of the vehicle to the vehicle measurement unit 120. With these pieces of information, the vehicle measurement unit 120 can use an approximate position and azimuth supplied from the GPS reception means as initial values of state vector $x_i$, or as backup data when the external index detection unit 105 detects no indices.

[13th Embodiment]

In the above embodiment, the vehicle measurement unit 120 calculates estimated value $x^*_k$ of the state vector at time $t_k$ using state equation $f_k(x_{k-1})$. In this embodiment, the vehicle measurement means further has an accelerometer for measuring the acceleration of the rotation and translation of the vehicle, and the vehicle measurement unit 120 calculates estimated value $x^*_k$ of the state vector on the basis of the acceleration of the rotation and translation of the vehicle measured by the accelerometer, and $f_k(x_{k-1})$. Since a method of arranging the accelerometer used to measure the acceleration of rotation and translation of an object, and a method of using the measured value of the acceleration of rotation and translation of an object in estimation of a state vector that presents the position and orientation, and their time derivative components are described in, e.g., Yasuyoshi Yokokoji, Yoshihiko Sugawara, & Tsuneo Yoshikawa, "Accurate Image Overlay on HMD using Vision and Accelerometers", Transactions of the Virtual Reality Society of Japan, Vol. 4, No. 4, pp. 589–598, 1999, a detailed description thereof will be omitted.

In this way, the precision of estimated value $x^*_k$ especially in an instance where the vehicle state changes abruptly can be improved, and the effect of accurately displaying navigation information in such instance is expected. Note that the head measurement means may adopt an arrangement having an accelerometer used to measure the acceleration of rotation and translation of the head of the passenger 132, and the same effect is expected in the head measurement.

[14th Embodiment]

The above embodiment is achieved under the condition that z-coordinate $^b z_w$ of the vehicle on real scene coordinate system $\Sigma_b$ is a fixed value. However, in this embodiment, $^b z_w$ is measured and dynamically set to realize accurate information display when the altitude of the vehicle has changed. The value $^b z_w$ can be set using altitude information received via a GPS. Likewise, the above embodiment is achieved under the condition that the tilt angle (roll and pitch angles) of the vehicle is constant. In this embodiment, the tilt angle of the vehicle is measured and dynamically set to realize accurate information display when the tilt angle of the vehicle has changed. The tilt angle can be measured by, e.g., a clinometer attached to the vehicle.

[15th Embodiment]

In the above embodiment, an image is displayed on the front windshield by the projector 160 and combiner 170. However, the present invention is not limited to such specific arrangement, and various other HUDs may be used. For example, when a known HUD that exploits holography is used, a virtual image can be formed near an object.

[16th Embodiment]

In the above embodiment, the vehicle measurement means is arranged as a part of the image display apparatus. However, the present invention is not limited to such specific arrangement. For example, the vehicle measurement means can be used in any other applications required to measure the position and/or the azimuth of the vehicle.

[17th Embodiment]

The index selector 610 described in each of the above embodiments can be applied to any other applications that select a non-occluded index on an image in addition to the aforementioned use purpose. Especially, for the purpose of measuring the position and orientation of an HMD-mounted camera or a person who wears the HMD on the basis of an image sensed by that camera in a mixed reality presentation apparatus, the index selector 610 can be applied to the index detection process. Note that the index is not limited to a texture-like index detected by template matching as in the above embodiment. For example, any other indices used to specify positions on an image like markers having specific colors or shapes may be adopted, and the index selector 610 can be used for such indices. Upon executing an identification process of an image feature which becomes a candidate of an index detected on an image, the index selector 610 works on a process for selecting a corresponding index or its candidate from indices in the real space.

[18th Embodiment]

This embodiment and subsequent embodiments relate to a technique for improving the measurement precision in the measurement of the position and orientation in the above embodiments.

Figure 10:
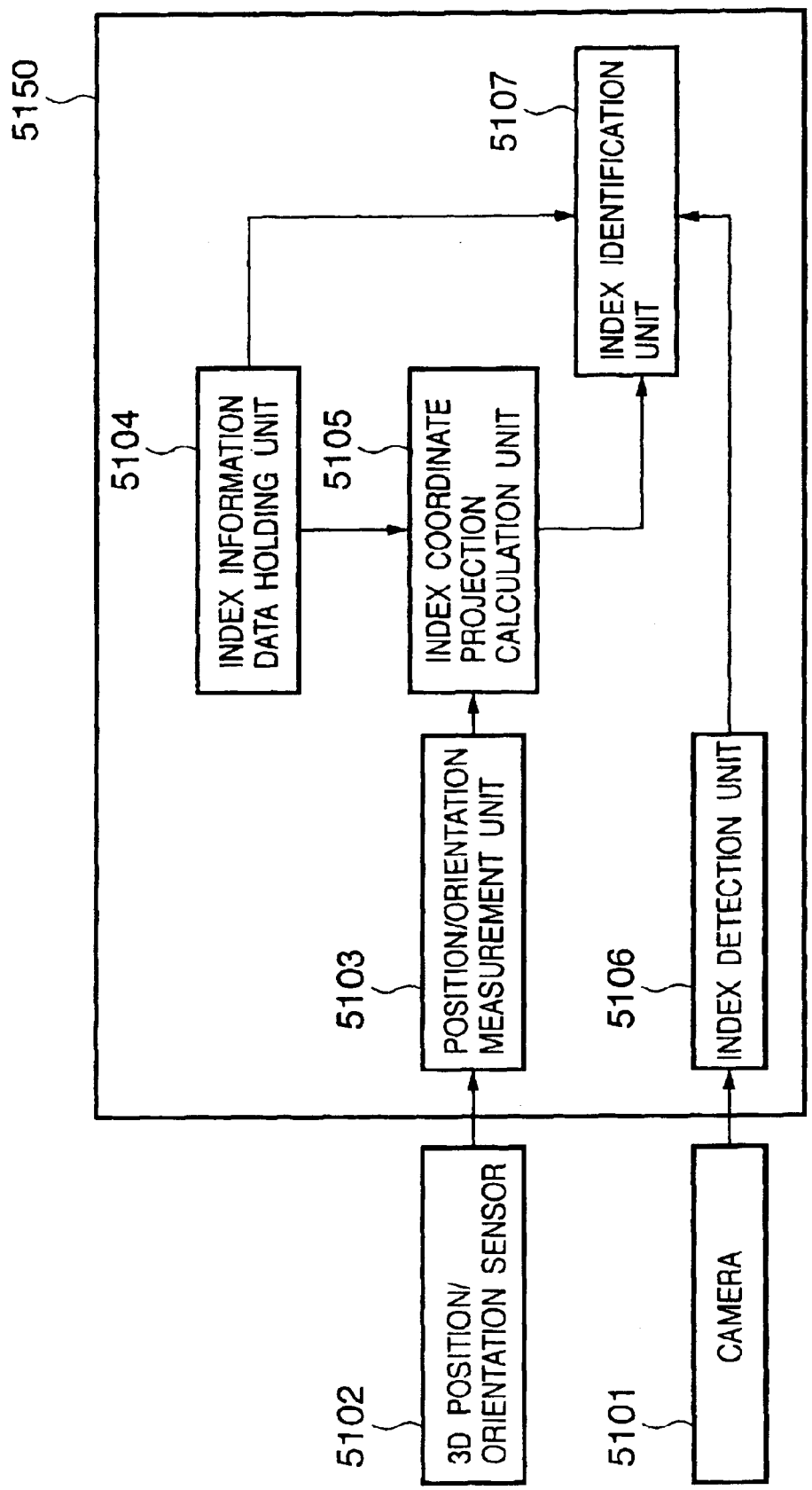
FIG. 10 is a block diagram showing the functional arrangement of a system including an information processing apparatus according to the 18th embodiment of the present invention.
Figure 11:
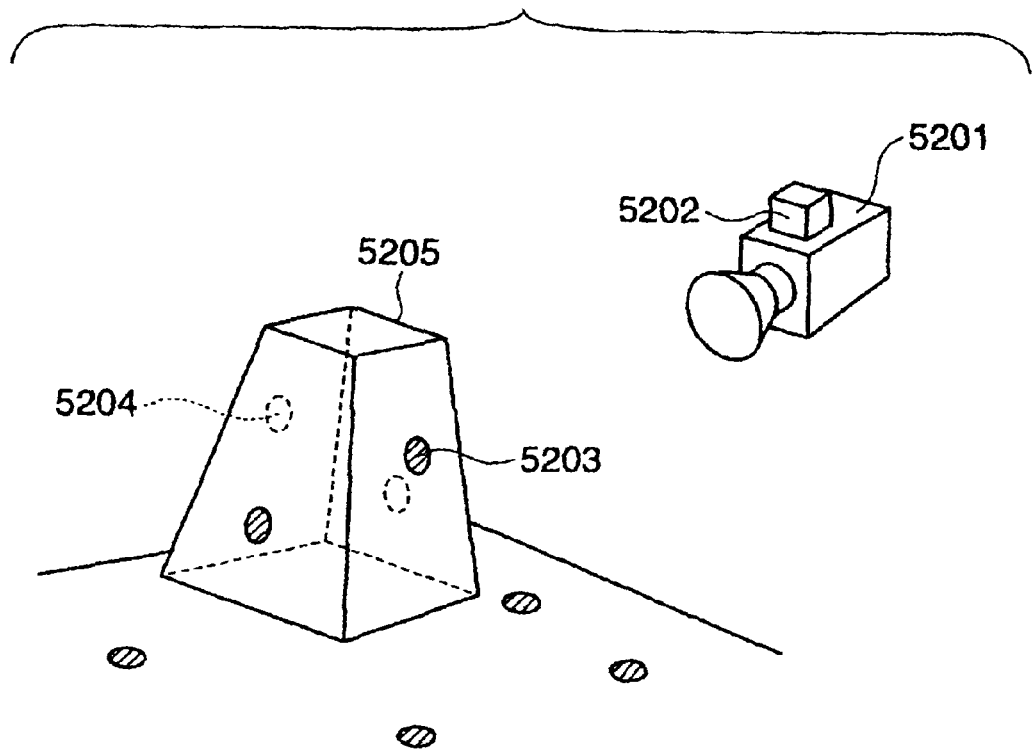
FIG. 11 is a schematic perspective view showing markers as indices arranged in a real space, and a camera to which a 3D position/orientation measurement device is fixed so as to explain the conventional problems.

FIG. 10 is a block diagram showing the functional arrangement of a system including an information processing apparatus according to this embodiment. This system is roughly classified into a camera 5101 used to sense an image on a real space, a 3D position/orientation sensor 5102 used to measure the position and orientation of the camera 5101, and a computer 5150 which serves as an information processing apparatus according to this embodiment.

The system according to this embodiment executes a process for identifying which of indices laid out on the real space ("layout" means both intended one and unintended one like that of natural features) corresponds to an index detected from an image of the real space, which is sensed by the camera 5101 and includes indices laid out on the real space, by determining correspondence between identical ones of the coordinate positions of the indices detected from the sensed image and those of indices to be located on the sensed image on the basis of the position and orientation of the camera 5101.

Respective units which form the system shown in FIG. 10 will be described in more detail below.

The 3D position/orientation sensor 5102 is mounted on the camera 5101, and its mount position is fixed. The 3D position/orientation sensor 5102 measures the 3D position and orientation (each of which has three degrees of freedom) of the camera 5101. In this case, the position and orientation to be measured are those of the camera 5101 on a sensor coordinate system. For example, when the 3D position/orientation sensor 5102 is a magnetic sensor, the sensor coordinate system indicates a coordinate system on which the position of an oscillator which generates magnetism is set as an origin, and three orthogonal axes which pass the origin are respectively set as x-, y-, and z-axes. Therefore, the computer 5150 (to be described later) receives data indicating the position and orientation of the camera 5101 on the sensor coordinate system measured by the 3D position/orientation sensor 5102 together with data of an image of the real space sensed by the camera 5101.

Respective units which form the computer 5150 will be described below. A position/orientation measurement unit 5103 drives and controls the 3D position/orientation sensor 5102 to measure the position and orientation of the camera 5101 on the sensor coordinate system, and outputs data of the measurement result (position and orientation values) to an index coordinate projection calculation unit 5105.

An index information data holding unit 5104 saves data of coordinate positions of respective indices of the real space on a world coordinate system in advance. The index coordinate projection calculation unit 5105 executes a transformation process (to be described later) on the basis of data indicating the position and orientation of the camera 5101 on the sensor coordinate system measured by the 3D position/orientation sensor 5102 to project the coordinate positions of respective indices on the world coordinate system onto the image (sensed image) sensed by the camera 5101, and calculates the coordinate values of respective indices on the sensed image.

An index detection unit 5106 detects indices included in the sensed image sensed by and input from the camera 5101, and calculates the coordinate positions of the detected indices on the sensed image. The unit 5106 outputs data of the calculated coordinate positions to an index identification unit 5107.

The index identification unit 5107 determines which of indices that are actually laid out corresponds to an index detected from the sensed image using "the coordinate positions of respective indices projected onto the sensed image" output from the index coordinate projection calculation unit 5105, "the coordinate positions of respective indices detected from the sensed image" output from the index detection unit 5106, "normal vectors to respective indices" (to be described in detail later) held by the index information data holding unit 5104, and "a visual axis vector of the camera 5101" (to be described in detail later) obtained from the orientation of the camera 5101 on the world coordinate system.

Note that "normal vectors to respective indices" indicate those to planes (in some cases, curved surfaces; in such case, normal vectors to tangents) where respective indices are located. Therefore, the index information data holding unit 5104 holds sets of data of coordinate positions on the world coordinate system and data indicating normal vector components for respective indices. Note that a method of expressing normal vector components is not particularly limited. For example, a normal vector may be expressed by x-, y-, and z-axis components as a unit vector, or an expression method on a polar coordinate system may be used.

Figure 22:
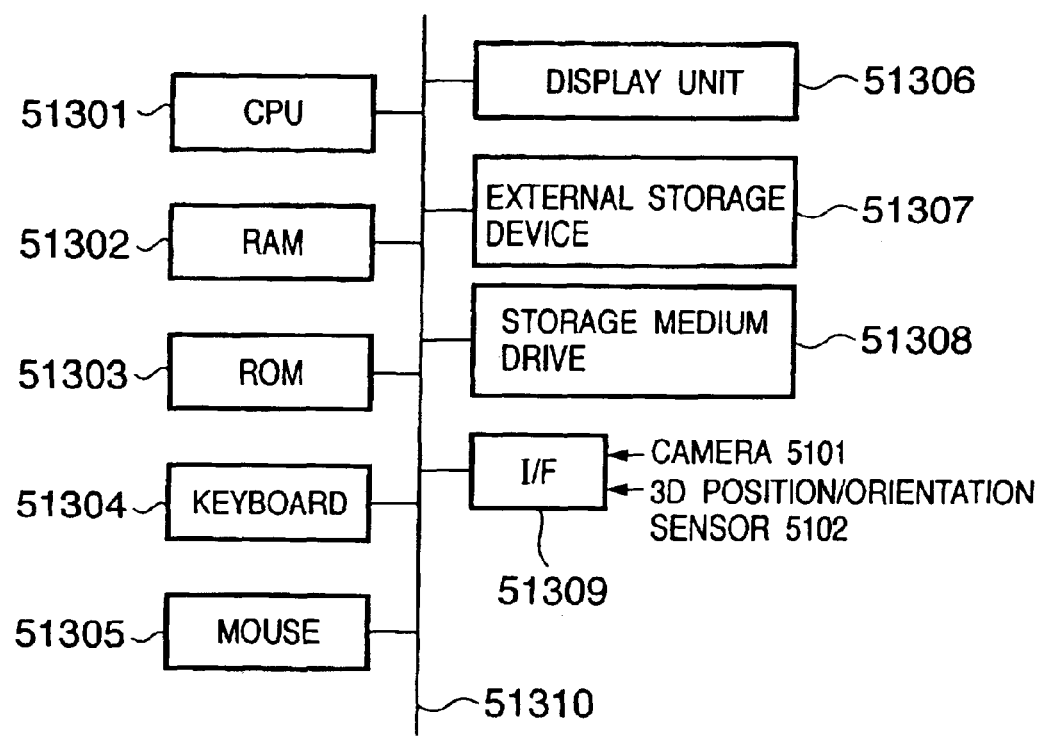
FIG. 22 is a block diagram showing the basic arrangement of a computer 5150.

FIG. 22 is a block diagram showing the basic arrangement of the computer 5150. Reference numeral 51301 denotes a CPU which controls the overall computer 5150 using programs and data stored in a RAM 51302 and ROM 51303, and executes an index identification process according to this embodiment (to be described later).

Reference numeral 51302 denotes a RAM which comprises an area for storing programs and data loaded from an external storage device 51307 and storage medium drive 51308, and also a work area used by the CPU 51301 to execute respective processes.

Reference numeral 51303 denotes a RAM which stores a boot program and the like.

Reference numerals 51304 and 51305 respectively denote a keyboard and mouse, which are used to input instructions to the CPU 51301.

Reference numeral 51306 denotes a display unit which comprises a CRT, liquid crystal display, or the like, and is used to display information such as images, text, and the like.

Reference numeral 51307 denotes an external storage device which serves as a large-capacity information storage device such as a hard disk drive, and can save an OS, programs and data required to make the CPU 51301 execute the index identification process according to this embodiment, and the like. Note that these programs and data are read out to the RAM 51302 as needed under the control of the CPU 51301.

Reference numeral 51308 denotes a storage medium drive, which executes a process for reading out programs and data stored in a CD-ROM, DVD-ROM, and the like to the external storage device 51307 and RAM 51302. When a storage medium is a recordable one such as a CD-R, DVD-RAM, or the like, the drive 51308 also executes a process for writing information on such medium.

Reference numeral 51309 denotes an interface (I/F) which is used to connect the camera 5101 and 3D position/orientation sensor 5102 shown in FIG. 10 to the computer 5150. An image sensed by the camera 5101 and data of the position and orientation of the camera 5101 on the sensor coordinate system measured by the 3D position/orientation sensor 5102 are input to the RAM 51302 via the interface 51309.

Reference numeral 51310 denotes a bus which interconnects the aforementioned units.

Figure 13:
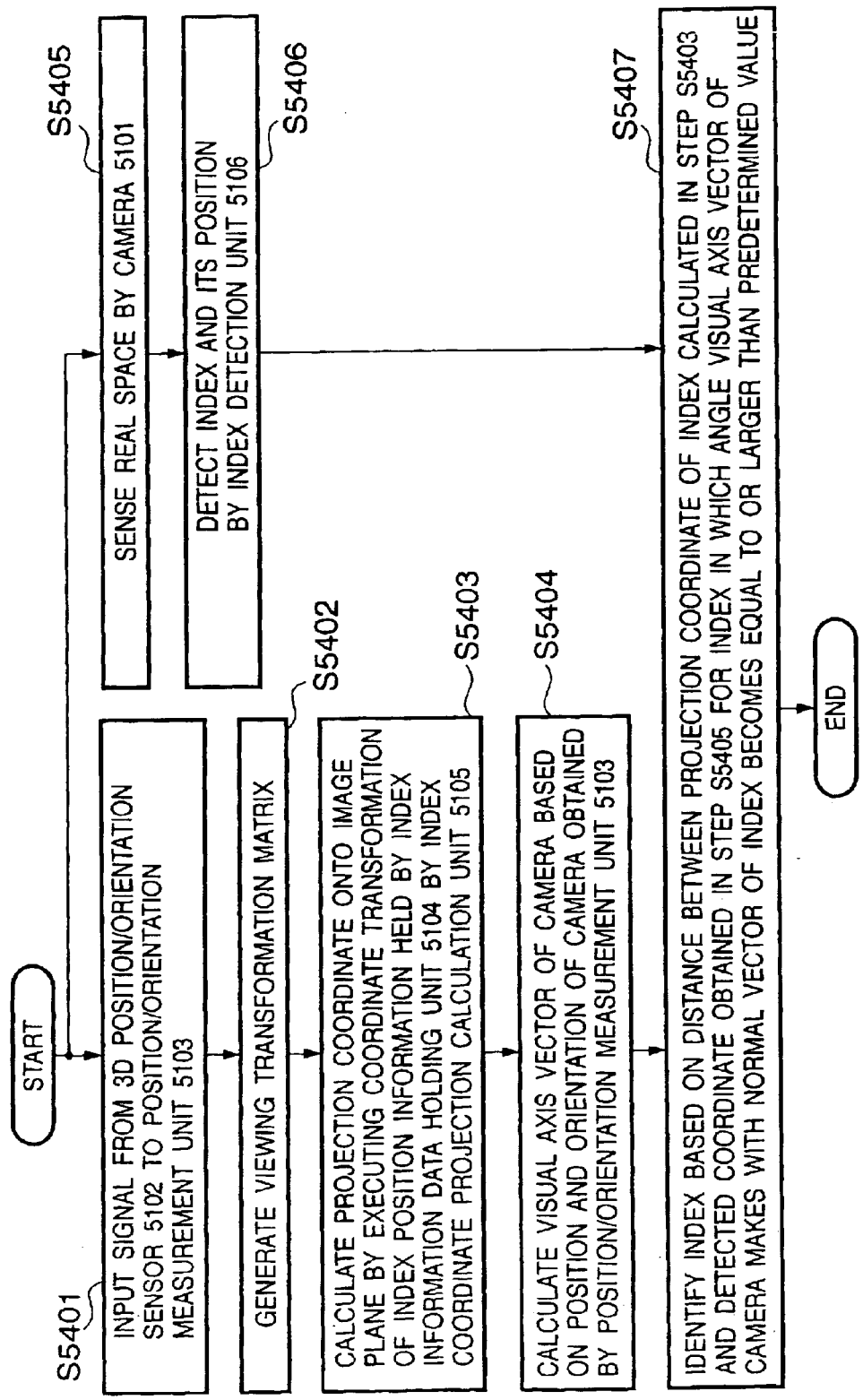
FIG. 13 is a flow chart of an index identification process according to the 18th embodiment of the present invention.

The index identification process according to this embodiment will be described below using FIG. 13 which shows the flow chart of that process. Note that a program according to the flow chart of FIG. 13 is stored in the external storage device 51307 or a storage medium, is read out to the RAM 51302 under the control of the CPU 51301 (when the program is stored in the storage medium, it is read out from that storage medium by controlling the storage medium drive 51308), and is executed by the CPU 51301. Thus, the information processing apparatus according to this embodiment executes processes to be described later. Therefore, the position/orientation measurement unit 5103, index coordinate projection calculation unit 5105, index detection unit 5106, and index identification unit 5107 which will appear in the following description are implemented by the program, but they may be implemented by hardware.

In step S5401, the 3D position/orientation sensor 5102 is controlled to measure the position and orientation of the camera 5101 on the sensor coordinate system, and inputs the measurement result data as a signal to the index coordinate projection calculation unit 5105. In step S5402, the index coordinate projection calculation unit 5105 calculates a viewing transformation matrix using the position and orientation data of the camera 5101 on the sensor coordinate system obtained in step S5401.

Note that the viewing transformation is a coordinate transformation between two coordinate systems when a 3D coordinate system which assumes the viewpoint position of the camera 5101 as an origin, the image sensing plane as an x-y plane, and the visual axis as a vector to the −z-axis is set as a camera coordinate system, and a coordinate system which assumes one point in the real space as an origin, and three orthogonal axes from this origin as x-, y-, and z-axes is set as a world coordinate system. Therefore, the viewing transformation matrix is used to attain the coordinate transformation between the two coordinate systems. Hence, if this viewing transformation matrix is obtained, a coordinate value on the world coordinate system can be transformed into that on the camera coordinate system. In other words, the viewing transformation matrix indicates the position and orientation of the camera 5101 on the world coordinate system. Since the sensor coordinate system is fixed within the world coordinate system, it is easy to calculate the position and orientation on the world coordinate system based on those on the sensor coordinate system. For this reason, the viewing transformation matrix can be generated from the position and orientation of the camera obtained on the sensor coordinate system.

In step S5403, the index coordinate projection calculation unit 5105 transforms the positions of respective indices on the world coordinate system, which are held in advance in the index information data holding unit 5104 into those on the camera coordinate system using the viewing transformation matrix calculated in step S5402. Also, the unit 5105 makes a perspective projection transformation calculation of the camera to calculate projection coordinates onto the sensed image plane. That is, in step S5403 the coordinate positions of respective indices to be located on the sensed image are calculated on the basis of the relationship between the positions of the indices on the world coordinate system and the position and orientation of the camera 5101 according to the calculated viewing transformation matrix.

Note that the perspective projection transformation of the camera is uniquely specified by the focal length and principal point (projection center) position of the camera 5101. The focal length and principal point (projection center) position of the camera 5101 are measured in advance and are stored as data in the external storage device 51307 or storage medium, and are read out to the RAM 51302 as needed.

Since the process for projecting an index onto the sensed image and calculating the coordinate position after projection in this way is a state-of-the-art technique, no more detailed description thereof will be given.

Furthermore, in step S5404 the index coordinate projection calculation unit 5105 calculates the visual axis vector of the camera 5101 on the basis of the orientation measurement value of the camera 5101 obtained from the position/orientation measurement unit 5103. Note that the visual axis vector of the camera 5101 indicates the −z-axis direction of the camera coordinate system. In other words, the orientation component of the camera 5101 on the world coordinate system corresponds to the visual axis vector component of the camera 5101. Hence, the visual axis vector of the camera 5101 can be easily calculated by transforming the orientation measurement value of the camera 5101 into that on the world coordinate system using the viewing transformation matrix. Note that this visual axis vector may be expressed by x-, y-, and z-axis components as a unit vector, or an expression method on a polar coordinate system may be used.

While executing the processes in steps S5401, S5402, S5403, and S5404, the camera 5101 senses an image of the real space in step S5405, and outputs the sensed image to the index detection unit 5106. In step S5406, the index detection unit 5106 detects indices contained in this sensed image, and calculates the coordinate positions of the detected indices. As for the detection process of the coordinate positions of indices in a sensed image, for example, a method of assigning a specific color to each index, detecting a closed region of this specific color from the sensed image, and determining the barycentric position of the detected closed region as the coordinate position of the index, a template matching method using templates obtained by sensing index regions of the real space in advance, and the like are available. In this embodiment, any of these methods may be used as long as the coordinate positions of indices in a sensed image can be detected.

In the aforementioned steps,
the coordinate positions of indices on the sensed image upon projecting the indices onto the sensed image,
the coordinate positions of indices detected from the sensed image, and
the visual axis vector of the camera 5101 can be obtained.

The process to be finally attained in this embodiment is to identify indices, i.e., to determine which of indices laid out in the real space corresponds to the index detected from the sensed image (index identification process).

Figure 12:
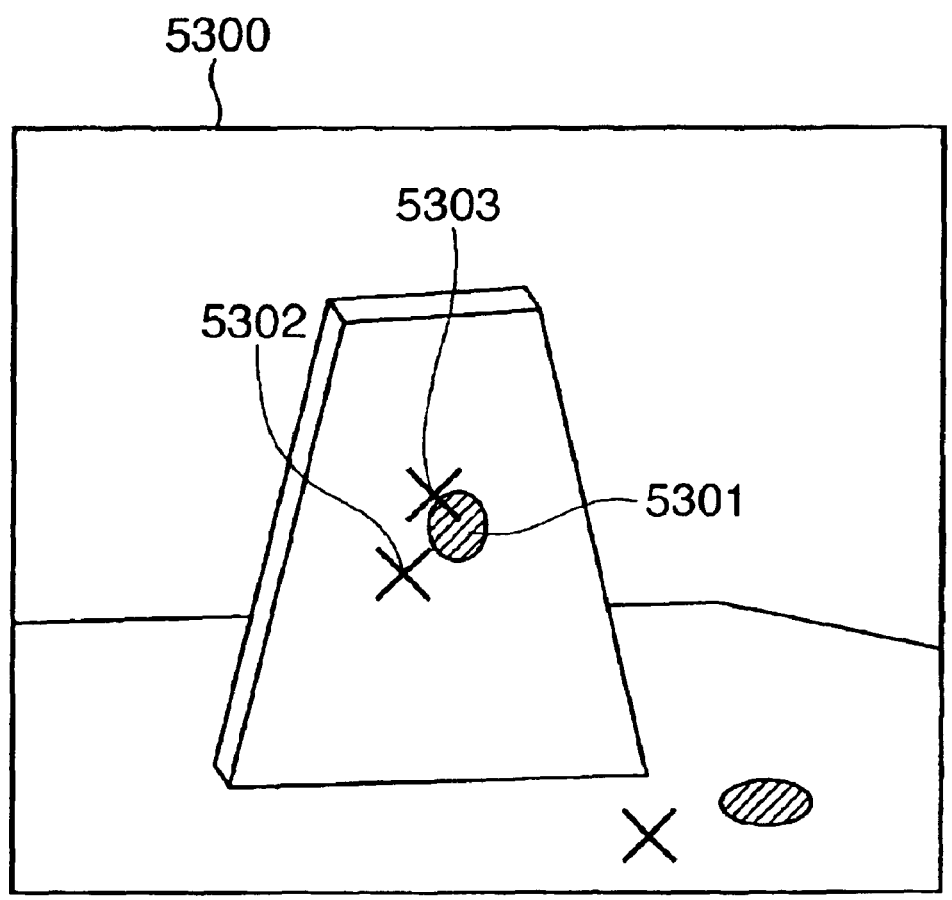
FIG. 12 is a schematic view showing a coordinate position obtained by projecting the measurement value of a 3D position/orientation sensor onto a screen, and a coordinate position obtained by detecting an index from an image so as to explain the conventional problems.

In a conventional identification method, the correspondence between indices is determined using the distances between the coordinate positions of indices projected onto the sensed image based on the position and orientation of the camera on the world coordinate system, and those of the indices detected from the sensed image, as described above. However, with this method, determination errors are generated under the condition shown in FIG. 12, as described above.

In this embodiment, in step S5407 indices are identified using "normal vectors to respective indices" held by the index information data holding unit 5104 and the visual axis vector of the camera 5101 obtained in step S5404 in addition to the coordinate positions of indices projected onto the sensed image and those of indices detected from the sensed image.

Initially, a process for selecting an index which is to undergo the index identification process from those projected onto the sensed image is executed. This process is attained by checking if the camera 5101 captures nearly the front side of an index. This process will be described in more detail below.

It is determined whether an angle the normal vector to an index of interest makes with the visual axis vector of the camera 5101 is equal to or larger than a predetermined value. If this angle is equal to or larger than the predetermined value, the value of a flag assigned to this index of interest is set to "1" to indicate that this index of interest is "an index which is to be used as an object to be processed in the index identification process executed later". On the other hand, if this angle is smaller than the predetermined value, the value of the flag assigned to this index of interest is set to "0" to indicate that this index of interest is "an index which is not to be used as an object to be processed in the index identification process executed later".

For example, when the camera 5101 captures an index from its front side, and the index faces the front of the camera 5101, the angle the normal vector to this index makes with the visual axis vector of the camera 5101 is nearly 180° (if the index perfectly faces the front of the camera 5101, this angle is 180°). If an index is present on the back side of a tower-like object shown in FIG. 12, since the normal vector to that index points to a direction near the visual axis vector of the camera 5101, the angle the two vectors make becomes small.

That is, whether the obverse or reverse side of the index faces the camera 5101 can be determined by examining if the angle the two vectors make is equal to or larger than 90°. Furthermore, even when the obverse side of the index faces the camera 5101, if the normal vector to that index is nearly perpendicular to the visual axis vector of the camera 5101, the index is not always normally captured as an image. Hence, the reference angle to be checked is set to be larger than 90° (90°+α(α≧0), and correspondence with only an index, not only the obverse side of which merely faces the camera 5101, but also which faces the camera 5101 more correctly may be determined.

In this way, an index which is not seen from the camera 5101 due to the shadow of an object or the like is excluded from the index identification process, thus suppressing correspondence errors.

The angle calculation and the comparison process of the calculated angle and predetermined value are executed for all indices projected onto the sensed image, and the comparison results are reflected on values of the flags assigned to respective indices, thus obtaining "indices which are to be used as objects in the index identification process executed later".

Only indices which are determined as "indices which are to be used as objects in the index identification process executed later" in the above process (i.e., indices with the flags=1) are projected onto the sensed image, the projected coordinate positions are compared with the coordinate positions of indices detected from the sensed image, and correspondence between indices with the closest coordinate positions is determined. In this manner, upon determining correspondence between indices with the closest coordinate positions, since each index is visible, correspondence errors can be suppressed.

In this embodiment, whether or not a given index is excluded from the index identification process is determined by examining if the angle the normal vector to that index makes with the visual axis vector of the camera 5101 is equal to or larger than the predetermined value. Alternatively, the following determination process may be used.

In place of an angle θ the normal vector to the index of interest makes with the visual axis vector of the camera 5101 (let x and y be these vectors, and the magnitude of each vector be normalized to 1), cos θ is used. This cos θ can be calculated by:

$$\cos \theta = x \cdot y \text{ (x·y indicates the inner product of vectors x and y)}$$

If the calculated value of cos θ falls within the range $-1 \leq \cos\theta \leq A(<0)$, the angle θ the two vectors make is at least 90° or more (A=0). Hence, if cos θ falls within this range, the index of interest may be used in the index identification process. In this way, whether or not the index of interest is to be excluded from the index identification process can be determined using cos θ.

In this embodiment, the process for determining values of flags for respective indices is executed before the index identification process. However, the present invention is not limited to such specific processing sequence. When the index of interest is determined as "an index which is to be used as an object in the index identification process executed later", distance comparison processes may be sequentially executed between the projected position of this index of interest and some other "coordinate positions of indices detected from the sensed image".

[19th Embodiment]

In the 18th embodiment, the 3D position/orientation sensor 5102 is mounted on the camera 5101, and an index fixed in position in the real space is sensed by the camera 5101 which moves dynamically. However, in this embodiment, the camera 5101 is fixed in position, and an object on which the 3D position/orientation sensor 5102 and an index are laid out is moved. Note that this embodiment is substantially the same as the 18th embodiment except for portions to be explained below.

Figure 15:
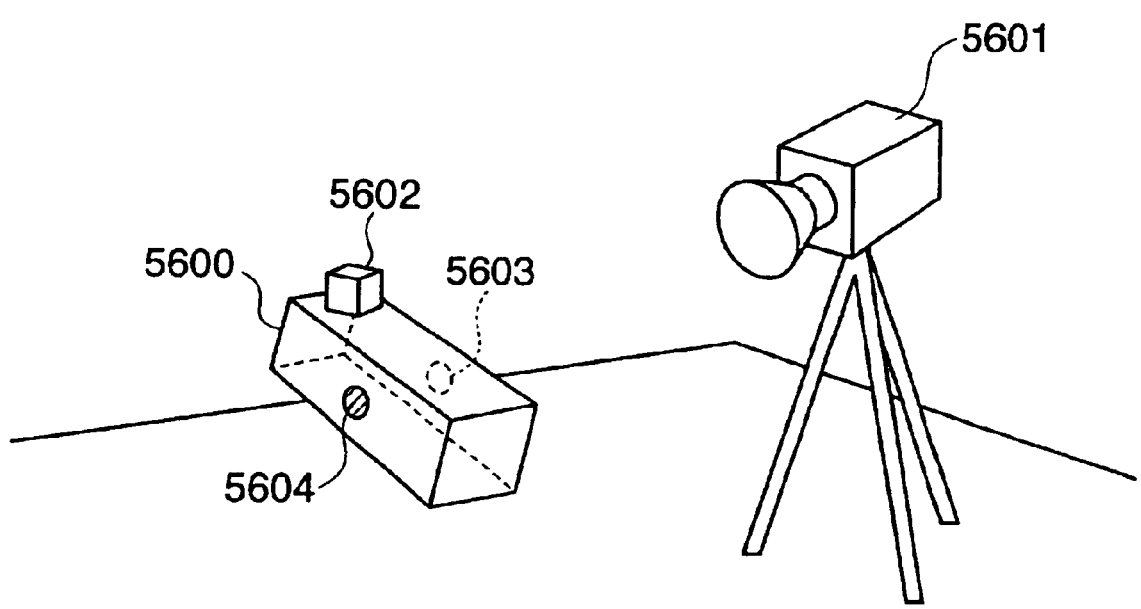
FIG. 15 is a perspective view of a system according to the 19th embodiment of the present invention.

FIG. 15 illustrates a system according to this embodiment. Reference numeral 5601 denotes a camera which is used to sense an image of the real space and is substantially the same as the camera 5101 in the 18th embodiment, except that its position and orientation on the world coordinate are fixed. Reference numeral 5600 denotes an object on which a 3D position/orientation sensor 5602 and indices 5603 and 5604 are fixed in position, and its position and orientation are always measured by the 3D position/orientation sensor 5602.

Figure 14:
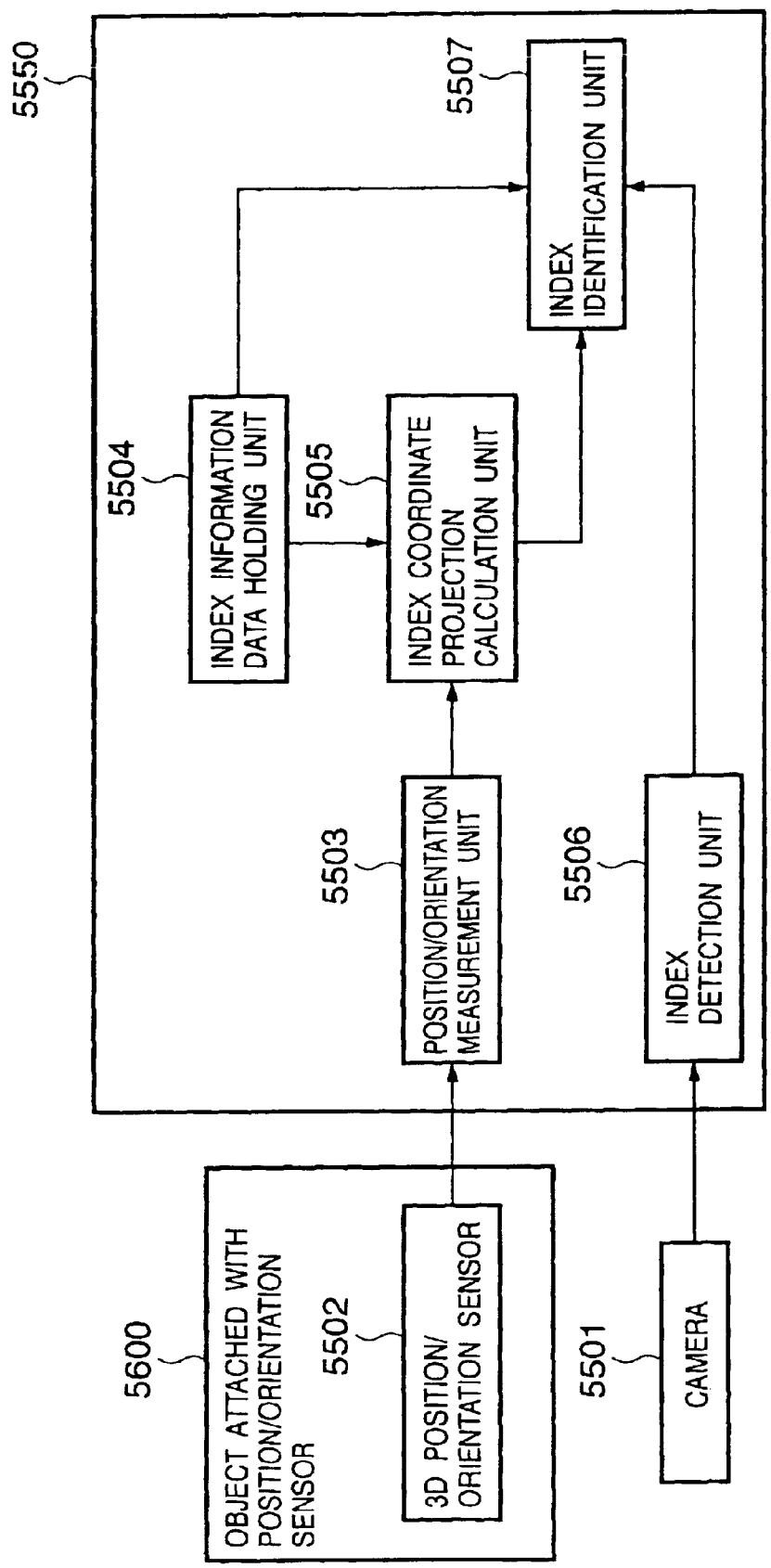
FIG. 14 is a block diagram showing the functional arrangement of a system including an information processing apparatus according to the 19th embodiment of the present invention.

FIG. 14 is a block diagram showing the functional arrangement of a system including an information processing apparatus according to this embodiment. This system is roughly classified into a camera 5501 used to sense an image on a real space, a 3D position/orientation sensor 5502 used to measure the position and orientation of the camera 5501, and a computer 5550 which serves as an information processing apparatus according to this embodiment.

The camera 5501 is the same as the camera 5101 in the 18th embodiment, and is used to sense an image of the real space and to output the sensed image to an index detection unit 5506. Since the position and orientation of the camera 5501 on the world coordinate system are fixed, as described above, data of the fixed position and orientation are measured in advance and are held in an index information data holding unit 5504. Also, since the position and orientation of the camera 5501 on the world coordinate system are fixed, the aforementioned viewing transformation matrix can be calculated in advance, and the calculation result is held in the index information data holding unit 5504.

The 3D position/orientation sensor 5502 is fixed to the object 5600, as described above, and is used to measure the 3D position and orientation (each of which has three degrees of freedom) of the object 5600. In this case, the position and orientation to be measured are those of the object 5600 on the "sensor coordinate system" as in the 18th embodiment. Therefore, the computer 5550 (to be described later) receives data indicating the position and orientation of the object 5600 on the sensor coordinate system measured by the 3D position/orientation sensor 5502 together with data of an image of the real space sensed by the camera 5501.

Respective units which form the computer 5550 will be described below. A position/orientation measurement unit 5503 drives and controls the 3D position/orientation sensor 5502 to measure the position and orientation of the object 5600 on the sensor coordinate system, and outputs data of the measurement result (position and orientation values) to an index coordinate projection calculation unit 5505.

The index information data holding unit 5504 saves data of the coordinate positions of respective indices of the real space on an object coordinate system (which assumes one point in the object 5600 as an origin, and three orthogonal axes from this origin as x-, y-, and z-axes), data of the position and orientation of the camera 5501 on the world coordinate system, and data of the viewing transformation matrix in advance. The index coordinate projection calculation unit 5505 executes a transformation process (to be described later) on the basis of these data to project the coordinate positions of respective indices on the world coordinate system onto the image (sensed image) sensed by the camera 5501, and calculates the coordinate values of respective indices on the sensed image.

The index detection unit 5506 executes the same process as the index detection unit 5106 of the 18th embodiment. That is, the unit 5506 detects indices included in the sensed image sensed by and input from the camera 5501, and calculates the coordinate positions of the detected indices on the sensed image. The unit 5506 outputs data of the calculated coordinate positions to an index identification unit 5507.

The index identification unit 5507 determines which of indices that are actually laid out corresponds to an index detected from the sensed image using "the coordinate positions of respective indices projected onto the sensed image" output from the index coordinate projection calculation unit 5505, "the coordinate positions of respective indices detected from the sensed image" output from the index detection unit 5506, "normal vectors to respective indices having components on the world coordinate system" (to be described in detail later) obtained by transforming data of normal vectors to indices held by the index information data holding unit 5104 by a transformation process to be described later, and "a visual axis vector of the camera 5501" obtained from the orientation of the camera 5501 on the world coordinate system held by the index information data holding unit.

The functional arrangement of the information processing apparatus according to this embodiment has been explained. The basic arrangement of the computer is the same as that in the 18th embodiment, i.e., that shown in FIG. 22.

Figure 16:
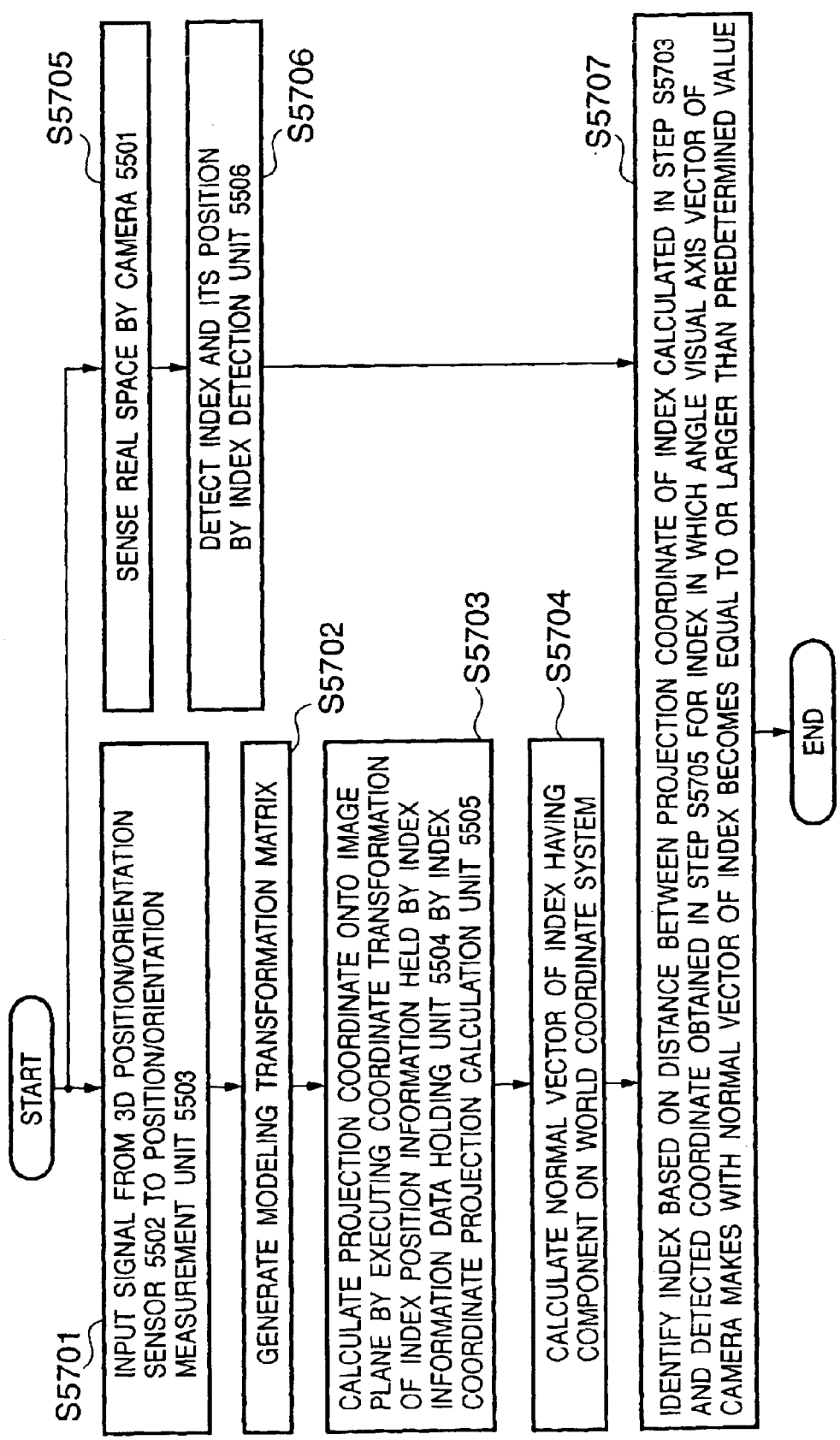
FIG. 16 is a flow chart of an index identification process according to the 19th embodiment of the present invention.

The index identification process according to this embodiment will be explained below using FIG. 16 which is the flow chart of that process. Note that a program according to the flow chart of FIG. 16 is stored in the external storage device 51307 or a storage medium, is read out to the RAM 51302 under the control of the CPU 51301 (when the program is stored in the storage medium, it is read out from that storage medium by controlling the storage medium drive 51308), and is executed by the CPU 51301. Thus, the information processing apparatus according to this embodiment executes processes to be described later. Therefore, the position/orientation measurement unit 5503, index coordinate projection calculation unit 5505, index detection unit 5506, and index identification unit 5507 which will appear in the following description are implemented by the program, but they may be implemented by hardware.

In step S5701, the 3D position/orientation sensor 5502 is controlled to measure the position and orientation of the object 5600 on the sensor coordinate system, and inputs the measurement result data as a signal to the index coordinate projection calculation unit 5505. In step S5702, the index coordinate projection calculation unit 5505 calculates a modeling transformation matrix using the position and orientation data of the object 5600 on the sensor coordinate system obtained in step S5701.

Note that the modeling transformation is a coordinate transformation between two coordinate systems when a coordinate system which assumes one point in the real space as an origin, and three orthogonal axes from this origin as x-, y-, and z-axes is set as a world coordinate system, and a coordinate system, which assumes one point in the object 5600 as an origin, and three orthogonal axes from this origin as x-, y-, and z-axes is set as an object coordinate system. Therefore, the modeling transformation matrix is used to attain the coordinate transformation between the two coordinate systems. Hence, if this viewing transformation matrix is obtained, a coordinate value on the object coordinate system can be transformed into that on the world coordinate system.

In step S5703, the index coordinate projection calculation unit 5505 transforms the positions of respective indices on the object coordinate system, which are held in advance in the index information data holding unit 5505 into those on the world coordinate system using the modeling transformation matrix calculated in step S5702. Also, the unit 5505 makes a viewing transformation using the viewing transformation matrix held by the index information data holding unit 5504 and a perspective projection transformation calculation of the camera to calculate projection coordinates onto the sensed image plane. That is, in step S5703 the coordinate positions of respective indices to be located on the sensed image are calculated on the basis of the positions and orientations of the camera 5501 and object 5600.

Note that the perspective projection transformation of the camera is uniquely specified by the focal length and principal point (projection center) position of the camera 5501. The focal length and principal point (projection center) position of the camera 5501 are measured in advance and are stored as data in the external storage device 51307 or storage medium, and are read out to the RAM 51302 as needed.

Since the process for projecting an index onto the sensed image and calculating the coordinate position after projection in this way is a state-of-the-art technique, no more detailed description thereof will be given.

Furthermore, in step S5704 the index coordinate projection calculation unit 5505 transforms the normal vectors to respective indices having components on the object coordinate system, which are held by the index information data holding unit 5504 into normal vectors having components on the world coordinate system using the modeling transformation matrix calculated in step S5702.

While executing the processes in steps S5701, S5702, S5703, and S5704, the camera 5501 senses an image of the real space in step S5705, and outputs the sensed image to the index detection unit 5506. In step S5706, the index detection unit 5506 detects the coordinate positions of indices contained in this sensed image. As for the detection process of the coordinate positions of indices in a sensed image, the same process as in the 18th embodiment is executed.

In the aforementioned steps, the coordinate positions of indices on the sensed image upon projecting the indices onto the sensed image, the coordinate positions of indices detected from the sensed image, and the normal vectors to indices having components on the world coordinate system can be obtained. The visual axis vector of the camera 5501 can be easily calculated from its orientation component since the position and orientation of the camera 5501 on the world coordinate system are fixed. Therefore, since these four pieces of information can be obtained, the same process as in the 18th embodiment can be executed.

As described above, according to this embodiment, even when the camera is fixed in position, and the object on which the 3D position/orientation sensor and indices are laid out is moved, the index identification process can be done.

[20th Embodiment]

The 18th embodiment assumes a case wherein the 3D position/orientation sensor is mounted on the camera, and an image of an index fixed in the real space is sensed by the camera which moves dynamically. The 19th embodiment assumes a case wherein the camera is fixed in position, and an object on which the 3D position/orientation sensor and indices are laid out is moved. These embodiments may be combined, i.e., 3D position/orientation sensors may be respectively fixed to the camera and object, and indices may be laid out on the object. That is, in this case, both the camera and object move dynamically.

This embodiment can be achieved by adding the following modification based on the 19th embodiment. That is, in the process executed in step S5703 in the 19th embodiment, the viewing transformation matrix of the camera is known. Instead, this viewing transformation matrix is calculated based on the measurement value of the 3D position/orientation sensor fixed to the camera by the method described in the 18th embodiment.

[21st Embodiment]

In the 18th to 20th embodiments, the normal vectors to indices are explicitly recorded in the index information data holding unit, and the process using these normal vectors is executed. However, the normal vectors need not always be explicitly recorded depending on the types of indices to be used.

Figure 17:
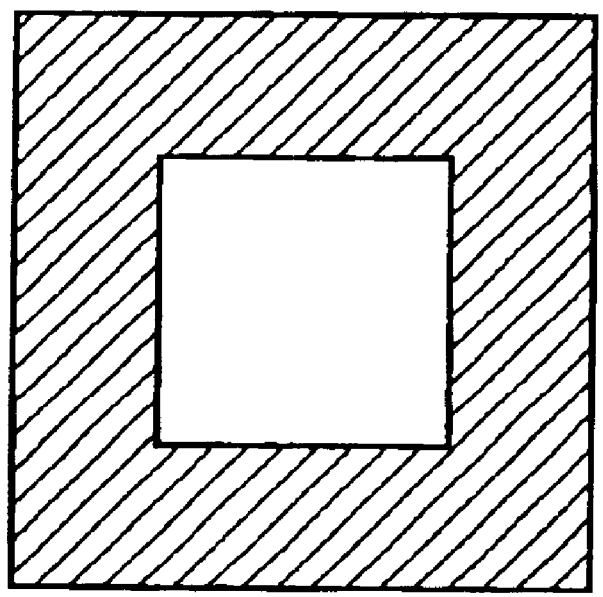
FIG. 17 shows an example of an index as a figure which has a two-dimensional spread in the 21st embodiment of the present invention.

For example, when an index expressed by a black square including a white square, as shown in FIG. 17, is used, if the coordinate positions (those on the world coordinate system or those on another coordinate system as long as it can be transformed into the coordinate positions on the world coordinate system) of the vertices of the index are recorded, a normal vector to this index can be calculated if that vector is not directly recorded.

Figure 21:
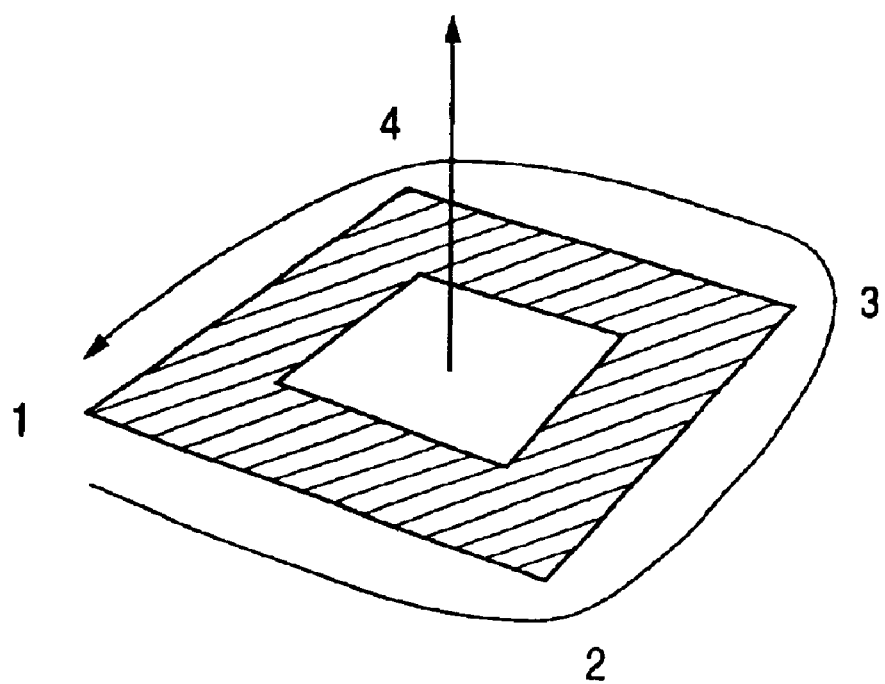
FIG. 21 is a view for explaining the method of calculating a normal vector to the index shown in FIG. 17.

By exploiting the fact that a normal (which is a line and has an indefinite direction) to a plane defined by four vertices is a line including a normal vector to the index, the direction on that line can be determined using the arrangement of four vertices, as shown in FIG. 21. As a practical calculation method, a method of calculating the outer product vector of a vector from vertex 1 to vertex 2 and that from vertex 2 to vertex 3 in FIG. 21 is available. That is, if an index to be used is a figure having a two-dimensional spread, its normal vector need not always be explicitly recorded. In this way, a normal vector can be calculated from information such as vertex information, which is not explicit normal information, and an index can be identified using the obtained normal vector.

By recording the position and orientation of an index in place of its normal vector, the normal vector can be calculated from the position and orientation of the index.

[22nd Embodiment]

A preferred embodiment of the camera position/orientation estimation method that utilizes the index identification result described in the 18th embodiment will be described.

Figure 19:
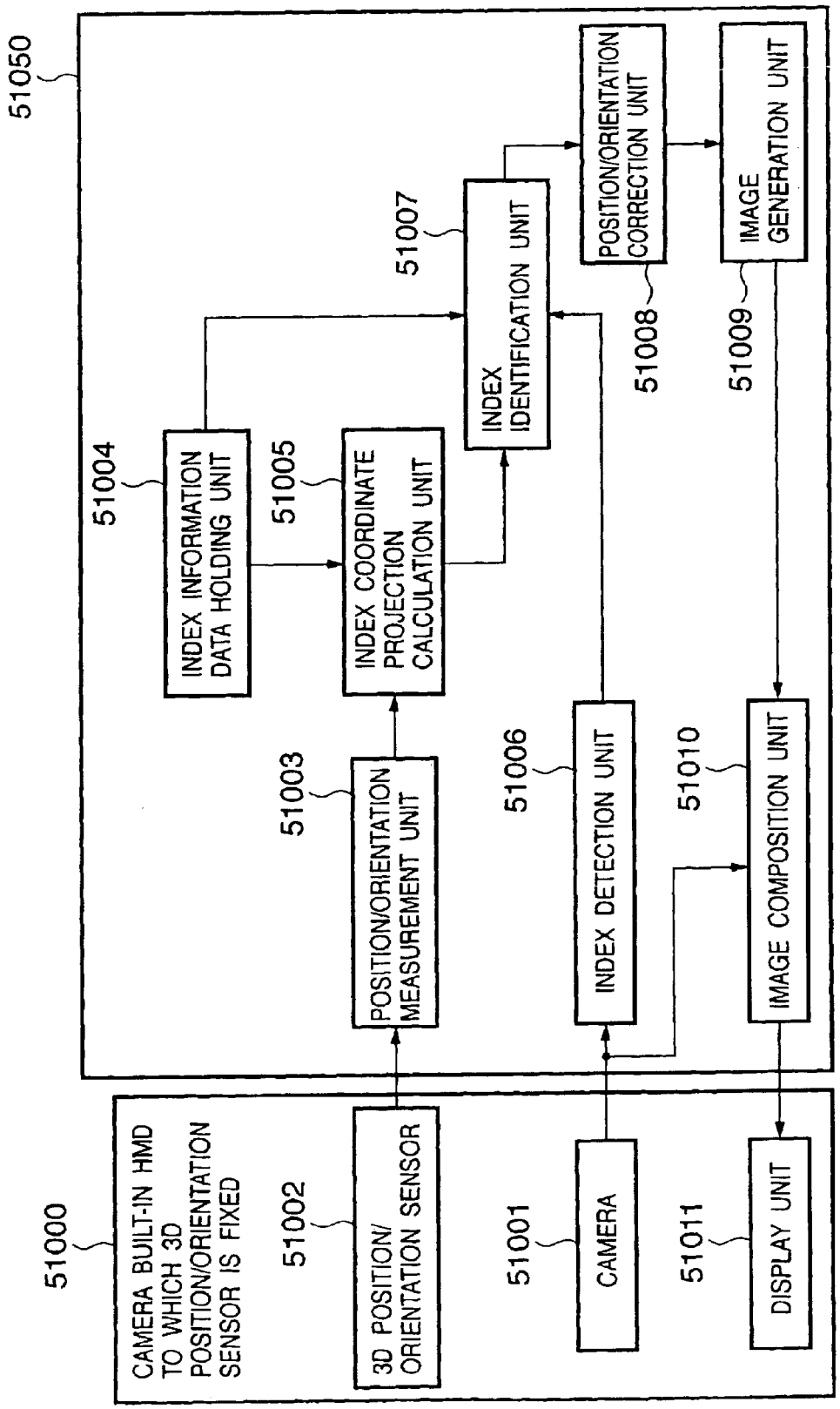
FIG. 19 is a block diagram showing the functional arrangement of a system including an information processing apparatus according to the 22nd embodiment of the present invention.

FIG. 19 is a block diagram showing the functional arrangement of a system including an information processing apparatus according to this embodiment. The system having the functional arrangement shown in FIG. 19 executes a process for correcting the position and orientation of an HMD using the result of the process for determining correspondence between identical indices on the sensed image, as described in the 18th embodiment. The system shown in FIG. 19 is roughly classified into an HMD 51000, and a computer 51050 which serves as an information processing apparatus according to this embodiment.

The HMD 51000 comprises a 3D position/orientation sensor 51002, camera 51001, and display unit 51011, which are attached to the HMD main body 51000 together to form a so-called video see-through HMD. The 3D position/orientation sensor 51002 and camera 51001 are basically the same as the 3D position/orientation sensor 5102 and camera 5101 in the 18th embodiment. The display unit 51011 displays an image output from an image composition unit 51010 of the computer 51050 to be described below.

Respective units which form the computer 51050 will be described below. Since a position/orientation measurement unit 51003, index information holding unit 51004, index coordinate projection calculation unit 51005, index detection unit 51006, and index identification unit 51007 respectively execute the same processes as those of the position/orientation measurement unit 5103, index information holding unit 5104, index coordinate projection calculation unit 5105, index detection unit 5106, and index identification unit 5107 in the 18th embodiment (shown in FIG. 10), a description thereof will be omitted.

A position/orientation correction unit 51008 corrects the position and orientation measurement values of the HMD 51000 as the measurement results of the 3D position/orientation sensor 51002 on the basis of the distance between the coordinate positions of two indices (one index is detected from the sensed image, and the other index is projected onto the sensed image), whose correspondence is determined by the index identification unit 51007.

An image generation unit 51009 uses the position and orientation corrected by the position/orientation correction unit 51008 as those of the viewpoint, and generates an image on a virtual space viewed from this viewpoint. An image composition unit 51010 composites the sensed image from the camera 51001 and the image on the virtual space generated by the image generation unit 51009. The composition result is output to the display unit 51011 of the HMD 51000 and is displayed on it.

Note that the basic arrangement of the computer 51050 according to this embodiment is the same as that in the 18th embodiment (i.e., the basic arrangement shown in FIG. 22).

Figure 20:
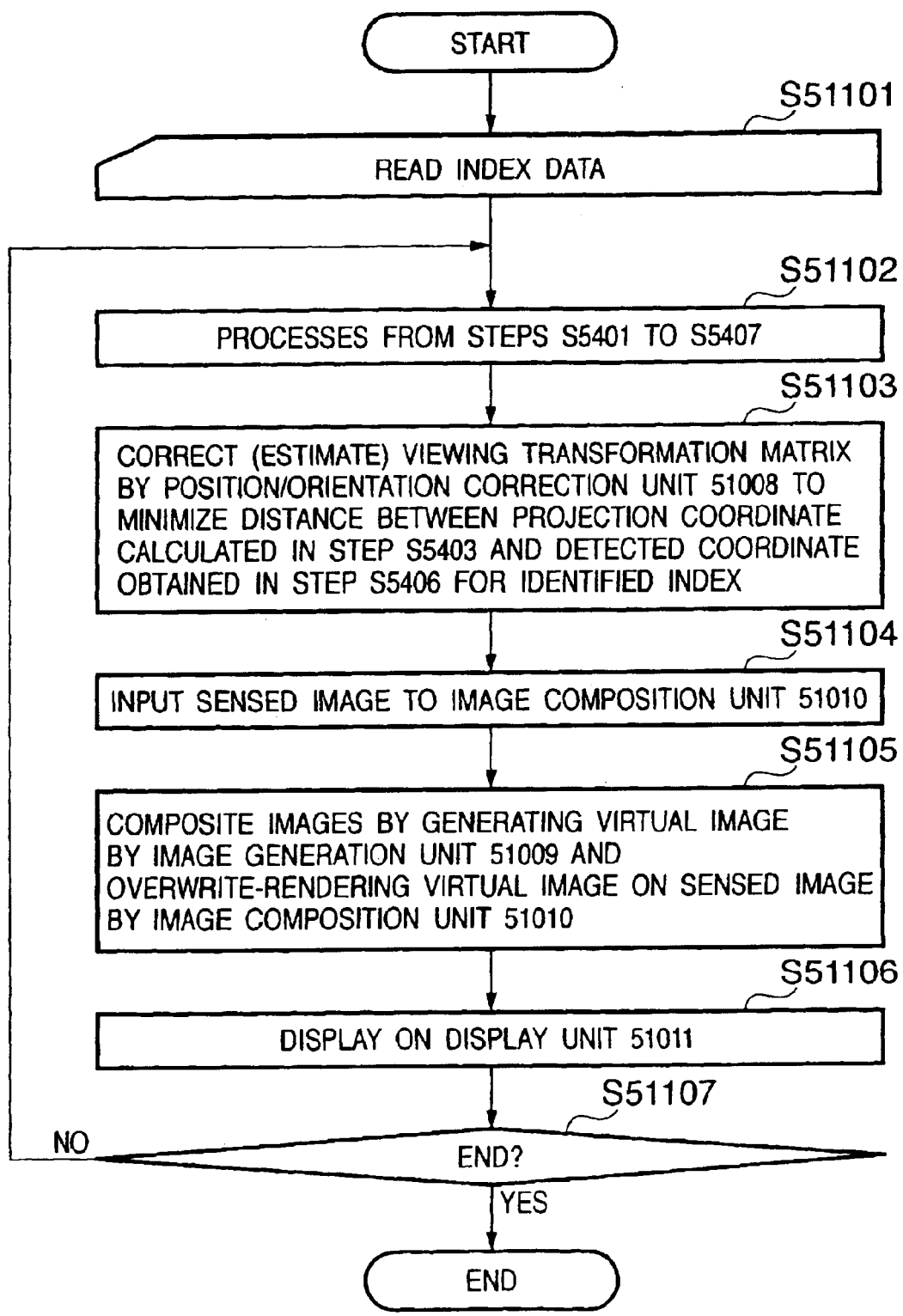
FIG. 20 is a flow chart showing the process to be executed by a computer 51050 according to the 22nd embodiment of the present invention until a composite image is output to a display unit 51011.

The process to be executed by the computer 51050 according to this embodiment until a composite image is output to the display unit 51011 will be described below using FIG. 20 which is the flow chart of that process. Note that a program according to the flow chart of FIG. 20 is stored in the external storage device 51307 or a storage medium, is read out to the RAM 51302 under the control of the CPU 51301 (when the program is stored in the storage medium, it is read out from that storage medium by controlling the storage medium drive 51308), and is executed by the CPU 51301. Thus, the information processing apparatus according to this embodiment executes processes to be described later. Therefore, the position/orientation measurement unit 51003, index coordinate projection calculation unit 51005, index detection unit 51006, index identification unit 51007, position/orientation correction unit 51008, image generation unit 51009, and image composition unit 51010, which will appear in the following description, are implemented by the program, but they may be implemented by hardware.

In step S51101, the index information data holding unit 51004 loads index data. This process is attached by reading text data shown in, e.g., FIG. 18 from a storage device that stores the text data as a file. In FIG. 18, a line 5901 expresses an index type which indicates a point-like index with a specific color in this example, and the coordinate value, normal vector, and color of that index are respectively recorded in lines 5902, 5903, and 5904. As shown in this data, the index information data holding unit 51004 holds normal vectors to indices as information together with their coordinate values.

Subsequently, in step S51102 the processes in steps S5401 to S5407 shown in FIG. 13 are executed to determine correspondence between corresponding indices.

In step 551103, the position/orientation correction unit 51008 corrects the viewing transformation matrix obtained in step S5402 on the basis of the distances between the corresponding indices determined in step S51102 (i.e., the distances between the projected coordinate values obtained in step S5403, and the detected coordinate values obtained in step S5406).

As for the viewing transformation matrix correction method, a method (e.g., Newton method) of minimizing an error by repetitive calculations may be used, or a method of correcting only a rotation transformation to minimize an error between indices may be used.

In step S51103, the viewing transformation matrix is corrected. In other words, this process corrects the position and orientation data of the camera 5101 on the world coordinate system. Since such method of correcting the viewing transformation matrix to minimize the distance between the projected coordinate value obtained in step S5403 and the detected coordinate value obtained in step S5406 for an identical index is a state-of-the-art technique, a description thereof will be omitted.

In step S51104, an image of the real space sensed by the camera 5101 is sent to the image composition unit 51010. In step S51105, the image generation unit 51009 generates an image of the virtual space, as described above, using the viewing transformation matrix corrected in step S51103, and sends it to the image composition unit 51010. Since the image composition unit 51010 has already received the image of the real space, it superimposes the image of the virtual space on the former image, thus consequently generating a composite image of the images of the real and virtual spaces. Hence, the image composition unit 51010 outputs this composite image to the display unit 51011 of the HMD 51000. The display unit 51011 displays the composite image.

Note that the processes in steps S51104 to S51106 are those to be executed when the virtual space or object is combined with the real space as an example of effectively utilizing the obtained viewing transformation of the camera. Hence, the viewing transformation of the camera may be used in other applications. Of course, if the viewing transformation is obtained, its inverse transform may be calculated to be easily transformed to the position and orientation of the camera on the world coordinate system. Hence, the viewing transformation of the camera can be used in applications which use the position and orientation of the camera.

After that, it is checked in step S51107 if the process is to end. If the process is not to end, the flow returns to step S51102 to repeat the processes in steps S51102 to S51106.

[23rd Embodiment]

The 22nd embodiment utilizes the index identification method of the 18th embodiment in the camera position/orientation estimation method. Also, using the index identification method of the 19th or 20th embodiment, the same object can be achieved in the same processes as those in the 22nd embodiment.

[Other Embodiments]

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores the program codes corresponding to the aforementioned flow charts.

As described above, according to the present invention, it can realize that an image display apparatus for measuring position and azimuth of the vehicle and a position of a head of the passenger on the vehicle with accuracy, and superimposing navigation information in a vehicle at an appropriate position on a real scene and then providing the result.

As described above, according to the present invention, it can realize to accurately identify which of indices arranged in a real space corresponds to an index detected from an image.

As many apparently widely different embodiments of the present invention can be made without departing from the spirit and scope thereof, it is to be understood that the invention is not limited to the specific embodiments thereof except as defined in the claims.

What is claimed is:

1. An information processing method which comprises a detection step of detecting a position of an index in a sensed image sensed by image sensing unit adapted to sense an image of a real space where the index is laid out, and a first calculation step of calculating a coordinate position of the index upon projecting the index in the real space onto the sensed image on the basis of the position of the index in the real space and a position and orientation of the image sensing unit when at least one of the position of the index in the real space and the position and orientation of the image sensing unit is obtained based on a measurement, and executes a process for determining correspondence between indices at coordinate positions with a smaller distance on the basis of coordinate positions of indices detected in the detection step and the coordinate position calculated in the first calculation step on the sensed image, comprising:

a second calculation step of calculating a value using a normal vector to an index of interest, and a visual axis vector of the image sensing unit; and a determination step of determining, on the basis of a range of the value calculated in the second calculation step, whether or not the process for calculating the coordinate position of the index of interest on the sensed image in the first calculation step is to be executed, wherein when it is determined in the determination step that the process for calculating the coordinate position of the index of interest on the sensed image in the first calculation step is to be executed, the process for determining correspondence between indices at coordinate positions with a smaller distance is executed based on the coordinate position of the index of interest calculated in the first calculation step and the coordinate positions of the indices detected in the detection step.

2. The method according to claim 1, wherein the second calculation step includes a step of calculating an angle the normal vector of the index of interest makes with the visual axis vector of the image sensing unit or a value based on the angle.

3. The method according to claim 2, wherein the determination step includes a step of determining that the process for calculating the coordinate position of the index of interest on the sensed image in the first calculation step is to be executed when the angle is $90°+\alpha(\alpha \geqq 0)$.

4. The method according to claim 1, further comprising:

a correction step of correcting the position and orientation of the image sensing unit using a distance between the coordinate position calculated in the first calculation step and the coordinate position detected in the detection step of the determined corresponding indices;

a virtual space image generation step of generating an image of a virtual space using the position and orientation corrected in the correction step; and a composition step of compositing and outputting the image of the virtual space generated in the virtual space image generation step and the sensed image sensed by the image sensing unit.

5. A program for making a computer execute an information processing method of claim 1.

6. A computer readable storage medium storing a program of claim 5.

7. An information processing apparatus which comprises image sensing unit adapted to sense an image of a real space where an index is laid out, detection unit adapted to detect a position of the index in a sensed image sensed by the image sensing unit, and first calculation unit adapted to, when at least one of a position of an index in the real space and a position and orientation of the image sensing unit is obtained based on a measurement, calculating a coordinate position of the index upon projecting the index in the real space onto the sensed image on the basis of the position of the index in the real space and the position and orientation of the image sensing unit, and executes a process for determining correspondence between indices at coordinate positions with a smaller distance on the basis of coordinate positions of indices detected by the detection unit and the coordinate position calculated by the first calculation unit, on the sensed image, comprising:

second calculation unit adapted to calculate a value using a normal vector to an index of interest, and a visual axis vector of the image sensing unit; and determination unit adapted to determine, on the basis of a range of the value calculated by said second calculation unit, whether or not the process for calculating the coordinate position of the index of interest on the sensed image by the first calculation unit is to be executed, wherein when said determination unit determines that the process for calculating the coordinate position of the index of interest on the sensed image by the first calculation unit is to be executed, the process for determining correspondence between indices at coordinate positions with a smaller distance is executed based on the coordinate position of the index of interest calculated by the first calculation unit and the coordinate positions of the indices detected by the detection unit.

8. An identification method of an index used to measure a position and orientation of an image sensing device for sensing an image of a real space, comprising:

a position/orientation measuring step of measuring roughly a position and orientation of the image sensing device;

an image sensing step of sensing an image of a real space including an index using the image sensing device;

a first image coordinate calculation step of calculating coordinate of the index, which is included in the image of the real space obtained in the image sensing step, in the obtained image; and a second image coordinate calculation step of calculating a position of the index in a sensed image sensed by the image sensing device, whose position and orientation are obtained in the position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the position/orientation measuring step and a normal vector of the index.

9. An identification method of an index used to measure a position and orientation of an object in a real space, comprising:

a position/orientation measuring step of measuring roughly a position and orientation of the object;

an image sensing step of sensing an image of the object using an image sensing device, which is fixed in position;

a first image coordinate calculation step of calculating coordinate of an index, which is included in the image of the object obtained in the image sensing step, in the obtained image; and a second image coordinate calculation step of calculating a position of the index in a sensed image sensed by the image sensing device, on the basis of position and orientation are obtained in the position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the position/orientation measuring step and a normal vector of the index.

10. An identification method of an index used to measure a position and orientation of an object in a real space, comprising:

a first position/orientation measuring step of measuring roughly a position and orientation of the object;

a second position/orientation measuring step of measuring roughly a position and orientation of an image sensing device which senses the object;

an image sensing step of sensing an image of the object using the image sensing device;

a first image coordinate calculation step of calculating coordinate of an index, which is included in the image of the object obtained in the image sensing step, in the obtained image; and a second image coordinate calculation step of calculating a position of the index in a sensed image sensed by the image sensing device, on the basis of a position and orientation of the object with reference to the image sensing device, or of the image sensing device with reference to the object, which is obtained in the first and second position/orientation measuring step, wherein the index is identified on the basis of the coordinate of the index calculated in the first image coordinate calculation step, the coordinate of the index calculated in the second image coordinate calculation step, and relationship between a visual axis vector of the image sensing device obtained in the second position/orientation measuring step, and a normal vector of the index obtained in the first position/orientation measuring step.

* * * * *

UNITED STATES PATENT AND TRADEMARK OFFICE
CERTIFICATE OF CORRECTION

PATENT NO. : 6,956,503 B2
APPLICATION NO. : 10/660637
DATED : October 18, 2005
INVENTOR(S) : Yokokohji et al.

It is certified that error appears in the above-identified patent and that said Letters Patent is hereby corrected as shown below:

COVER PAGE:
Item (56), References Cited, OTHER PUBLICATIONS, "Viedo" should read --Video --.

COLUMN 2:
Line 46, "Registration" should read -- Positioning --.

COLUMN 3:
Line 31, "degree" should read -- degrees --.

COLUMN 4:
Line 25, "Image" should read -- image --.

COLUMN 12:
Line 16, "$f_k(c_k)$:" should read -- $f_k(x_k)$: --.

COLUMN 15:
Line 60, " $X_k = [{}^w r_u{}^T(t_k)\ {}^w \phi_u{}^T(t_k)\ {}^w r'_u{}^T(t_k)\ {}^w \omega_u{}^T(t_k)]^T$ "should read
-- $X_k = [{}^w r_u{}^T(t_k)\ {}^w \phi_u{}^T(t_k)\ {}^w r'_u{}^T(t_k)\ {}^w \omega_u{}^T(t_k)]^T$ --

COLUMN 17:
Line 44 " ${}^d r_k = {}^w R_d{}^{-1}({}^w r_u - {}^w r_d)$ " should read -- ${}^d r_u = {}^w R_d{}^{-1}({}^w r_u - {}^w r_d)$ --.

COLUMN 20:
Line 9, "allow" should read -- allow one --.

COLUMN 33:
Line 31, "step 551103," should read -- step S51103, --.

UNITED STATES PATENT AND TRADEMARK OFFICE
CERTIFICATE OF CORRECTION

PATENT NO. : 6,956,503 B2
APPLICATION NO. : 10/660637
DATED : October 18, 2005
INVENTOR(S) : Yokokohji et al.

It is certified that error appears in the above-identified patent and that said Letters Patent is hereby corrected as shown below:

COLUMN 36:
Line 11, "second" should read -- a second --; and
Line 14, "determination" should read -- a determination --.

Signed and Sealed this

Fourteenth Day of November, 2006

JON W. DUDAS
*Director of the United States Patent and Trademark Office*